(12) United States Patent
Abe et al.

(10) Patent No.: US 8,138,645 B2
(45) Date of Patent: Mar. 20, 2012

(54) ELECTRIC MOTOR, ROTARY ACTUATOR AND ROTARY APPARATUS

(75) Inventors: Hidefumi Abe, Sendai (JP); Hideki Sasaki, Sendai (JP); Toshiro Mayumi, Shibata-gun (JP); Eishin Matsumoto, Souma (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 12/731,375

(22) Filed: Mar. 25, 2010

(65) Prior Publication Data

US 2010/0176672 A1 Jul. 15, 2010

Related U.S. Application Data

(62) Division of application No. 12/076,209, filed on Mar. 14, 2008, now Pat. No. 7,772,731.

(30) Foreign Application Priority Data

Mar. 16, 2007 (JP) ................................ 2007-068768
Mar. 16, 2007 (JP) ................................ 2007-069358
Mar. 16, 2007 (JP) ................................ 2007-069359

(51) Int. Cl.
H02K 11/00 (2006.01)

(52) U.S. Cl. ........................................................ 310/71

(58) Field of Classification Search .............. 310/71, 310/67 R, 68 R
See application file for complete search history.

(56) References Cited

U.S. PATENT DOCUMENTS

| 4,988,905 A | 1/1991 | Tolmie, Jr. |
| 5,245,258 A | 9/1993 | Becker et al. |
| 5,661,352 A * | 8/1997 | Oguchi et al. ................. 310/71 |
| 6,002,185 A | 12/1999 | Nakao et al. |
| 6,570,280 B2 * | 5/2003 | Takahashi ....................... 310/71 |
| 6,661,140 B2 | 12/2003 | Agnes et al. |
| 6,906,438 B2 * | 6/2005 | Ursel et al. ...................... 310/89 |
| 7,151,333 B2 * | 12/2006 | Suzuki et al. .................. 310/71 |
| 7,812,489 B2 * | 10/2010 | Hino et al. ...................... 310/71 |
| 2002/0047504 A1 * | 4/2002 | Takahashi |
| 2004/0108778 A1 | 6/2004 | Tsukamoto et al. |
| 2004/0124727 A1 | 7/2004 | Lau |
| 2007/0023008 A1 | 2/2007 | Kondo |
| 2007/0145839 A1 | 6/2007 | Kimura et al. |

FOREIGN PATENT DOCUMENTS

| JP | 06-006679 | 1/1994 |
| JP | 2000-014112 | 1/2000 |
| JP | 2004-052928 | 2/2004 |
| JP | 2004-166481 | 6/2004 |

OTHER PUBLICATIONS

Notice of Reasons for Rejection Office Action corresponding to Japanese Application No. 2007-069358 dated Jan. 4, 2012.

* cited by examiner

*Primary Examiner* — Nguyen N Hanh
(74) *Attorney, Agent, or Firm* — Squire Sanders (US) LLP

(57) ABSTRACT

A rotary actuator including: a housing that rotatably supports thereinside a rotor shaft of an electric motor; an eccentric shaft portion that is provided on a protruding end portion of the rotor shaft that protrudes outside the housing; an external gear that is rotatably supported on the eccentric shaft portion via a bearing; an internal gear that is fixed to an outer surface of the housing and meshes with the external gear; and a transmitting portion that is provided on the external gear, and transmits rotation force to an external output shaft.

4 Claims, 21 Drawing Sheets

ELECTRIC MOTOR, ROTARY ACTUATOR AND ROTARY APPARATUS

CROSS-REFERENCE RELATED APPLICATIONS

This is a Divisional patent application of U.S. patent application Ser. No. 12/076,209, filed on Mar. 14, 2008. The disclosure of the prior application is hereby incorporated by reference herein in its entirety.

Priority is claimed on: Japanese Patent Application No. 2007-068768, filed on Mar. 16, 2007; Japanese Patent Application No. 2007-069358, filed on Mar. 16, 2007; and Japanese Patent Application No. 2007-069359, filed on Mar. 16, 2007, the contents of which are incorporated herein by reference.

BACKGROUND OF THE INVENTION

1. Field of the Invention

The present invention relates to an electric motor, a rotary actuator that is provided with this electric motor, and a rotary apparatus that uses this rotary actuator.

2. Description of Related Art

The conventional technology of a rotary actuator and an electric motor provided for a rotary actuator is illustrated in Japanese Unexamined Patent Application, First Publication No. 2004-52928.

This rotary actuator is constructed by placing a synchronous electric motor and an internally-meshing planetary reduction gear which is connected to a rotor shaft (i.e., a first shaft) of this synchronous electric motor inside a single housing. This internally-meshing planetary reduction gear is provided with an external gear, an internal gear which internally meshes with this external gear, and a second shaft. The external gear is mounted on the internally-meshing planetary reduction gear in a state in which it is able to perform an eccentric rotation via an eccentric shaft portion that is provided at a position partway along the rotor shaft. The second shaft is linked to the internally-meshing planetary reduction gear via a transmission unit that only transmits the rotation components of the external gear.

In this case, a portion of the second shaft is formed as a cylinder, and the second shaft has a dual bearing structure in which the second shaft itself is rotatably supported in the housing via metal bearings, while the rotor shaft is rotatably supported via internal bearings inside the second shaft.

Three shaft portions, namely, the rotor shaft, the eccentric shaft portion, and the second shaft are provided in this type of conventional rotary actuator. Because of this, a total of four bearings are required to support these shaft portions, namely, one bearing at each end of the rotor shaft, one bearing for the eccentric shaft portion, and one bearing for the second shaft. In addition, two bearings are also required on the output side, so that a total of six bearings are required. In this manner, in a conventional rotary actuator, the problem arises that there are a large number of components.

Furthermore, as is described above, the second shaft has a dual bearing structure. Because the rotor shaft of the electric motor is supported inside the second shaft, the coaxial accuracy of this rotor shaft often deteriorates resulting in there being a tendency for vibration to occur. Because of this, in a conventional rotary actuator, it is necessary to ensure there is a large air gap between the rotor and the stator of the electric motor. Consequently, there is a tendency for the performance and efficiency of the electric motor to deteriorate.

Moreover, the above described electric motor according to the conventional technology is constructed by assembling various electrical components such as a rotor, a stator, and a board inside a housing. Here, one end portion of the shaft of the rotor is supported via a bearing by a front housing which forms one housing, while another end portion of the shaft of the rotor is supported via a bearing by a rear housing which forms another housing. Moreover, the board is fixed to the rear housing side, and a number of electrical components such as the rotor and stator are stacked in the axial direction of the rotor shaft from above the board.

Accordingly, when this type of electric motor is being assembled, it is necessary to fix the board at a comparatively early stage, and then electrically connect the board to terminals of the various electrical components using solder or the like prior to the board being covered by the other electrical components when they are assembled thereon.

However, when, as in the above described conventional electric motor, the task of assembling a large number of electrical components still remains after the above described electrical connections have been made, these electrical connections are affected by the subsequent assembly task. As a result, there is a possibility that the electrical reliability of the electric motor will deteriorate.

Furthermore, in the above described conventional electric motor, because a structure is employed in which the stator is assembled inside the housing, errors occur when the stator is being assembled in the housing so that it is difficult for the axial accuracy of the rotor and stator to be set to a high level. In this case, it is necessary to ensure there is a large air gap between the rotor and stator. Consequently, there is a tendency for the performance and efficiency of the electric motor to deteriorate.

The present invention was conceived in view of the above described circumstances, and it is a first object thereof to provide a rotary actuator and a rotation apparatus that uses this rotary actuator, in which the number of components is reduced, and in which the coaxial accuracy of the electric motor relative to the rotor shaft is increased, so that the performance and efficiency thereof are improved.

Moreover, it is a second object of the present invention to provide an electric motor and a rotary actuator which is provided with this electric motor, that enable electrical reliability to be improved.

Furthermore, it is a third object of the present invention to provide an electric motor and a rotary actuator which is provided with this electric motor, that enable the axial accuracy of the stator to be increased so that the performance and efficiency of the electric motor are improved.

SUMMARY OF THE INVENTION

In order to solve the above described problems, the present invention employs the followings.

Namely, a first aspect of the present invention is a rotary actuator including: a housing that rotatably supports thereinside a rotor shaft of an electric motor; an eccentric shaft portion that is provided on a protruding end portion of the rotor shaft that protrudes outside the housing; an external gear that is rotatably supported on the eccentric shaft portion via a bearing; an internal gear that is fixed to an outer surface of the housing and meshes with the external gear; and a transmitting portion that is provided on the external gear, and transmits rotation force to an external output shaft.

According to the above described rotary actuator, because only two shaft portions, namely, the rotor shaft of the electric motor and the eccentric shaft portion are provided in the rotary actuator, it is only necessary to provide a total of three bearings to support these shaft portions, namely one bearing for each end portion of the rotor shaft, and one bearing for the eccentric shaft portion. As a result, it is possible to simplify the structure by reducing the number of components. Moreover, without forming a dual bearing structure for the rotor shaft, as is the case in the conventional technology, it is possible to support the two end portions of the rotor shaft with a high level of precision, namely, the coaxial accuracy of the electric motor is improved. Because of this, the size of the air gap can also be reduced. As a result, a high-performance, highly efficient actuator can be created. Namely, according to the above described actuator, it is possible to achieve the first object of the present invention.

Furthermore, because a structure is employed in which an electric motor is placed inside a housing, and a reduction gear that includes an external gear and an internal gear is placed on an outer surface of the housing, the electric motor and the reduction gear can be mutually isolated with a wall of this housing. Furthermore, the electric motor can be kept in a sealed state even when lubricating oil is used in the reduction gear.

It may be arranged such that the housing is closed off by a removable cover on the opposite side of the housing from the side where the eccentric shaft portion is provided; and a recessed portion that removably holds a bearing that rotatably supports another end portion of the rotor shaft, is formed in an internal surface of the cover.

In this case, because the housing is placed in an open state when the cover is removed, it is easy to perform maintenance and the like on the electric motor.

A second aspect of the present invention is a rotary apparatus including: the rotary actuator according to the first aspect of the present invention; and an output mechanism that has the output shaft which is driven by the rotary actuator, an output side housing, and an output side transmitting portion, wherein the output shaft is rotatably supported inside the output side housing; one end portion of the output shaft penetrates a wall of the output side housing so as to protrude from the outer surface thereof; and the output side transmitting portion provided on the protruded end portion of the output shaft, to which a rotation component of the external gear is transmitted as a result of the output side transmitting portion being removably connected to the transmitting portion of the external gear.

According to the above described rotary apparatus, it is possible to limit the number of shaft portions required in the overall device to three, namely, the two shaft portions used in the above described rotary actuator and the one output shaft. Furthermore, it is possible to limit the number of bearings to five, namely, the three bearings used for the above described rotary actuator and the two bearings used for the output shaft. As a result, it is possible to simplify the structure by reducing the number of components. Namely, according to the above described rotary apparatus, the first object of the present invention can be achieved.

A third aspect of the present invention is an electric motor in which a rotor, a ring-shaped stator core that is positioned so as to encircle the rotor and that has a plurality of stator teeth around which coils are wound, a control board on which electronic components are mounted, motor driving leads that are used for electrically connecting the coils to the control board, and connector leads that are electrically connected to the control board are assembled inside a housing, wherein the control board is placed on an outer circumferential side of the stator core so as to be parallel with the axial direction of the stator core; and the motor driving leads and the connector leads are in contact with board side leads that are integral with the control board.

According to the above described electric motor, because a control board is placed on an outer circumferential side of a stator core, it is possible to electrically connect various electrical components to the control board after the electrical components that are placed on the inner circumferential side of the stator core, such as a rotor, have been assembled inside the housing. Namely, it is possible to reduce the number of electrical components that are assembled inside the housing after the electrical connections between the board side leads, the motor driving leads, and the connector leads have been performed by fusing (i.e., welding) or soldering or the like.

Accordingly, it is possible to prevent the stress generated when the other electrical components are being assembled, and stress which is based on dimensional irregularities of the housing being applied to the electrical connection portions, namely, to prevent the task of assembling other electrical components having an effect on the electrical connection portions. As a result, it is possible to achieve an improvement in the electrical reliability of the electric motor. Namely, according to the above described electric motor, the second object of the present invention can be achieved.

It may be arranged such that the housing is provided with a housing main body in which a board housing slot that houses at least a portion of the control board is formed; one end portions of both the motor driving leads and the connector leads extend to the interior of the board housing slot; and when the control board is housed in the board housing slot, contact portions between the board side leads and the respective one end portions of the motor driving leads and the connector leads protrude outside the board housing slot.

In this case, when the control board is housed in the board housing slot, contact portions between the board side leads and the one end portions of the motor driving leads and the connector leads protrude outside the board housing slot. Because of this, electrical connections between the board side leads, the motor driving leads, and the connector leads can be made easily.

It may be arranged such that one aperture of the board housing slot forms an insertion aperture into which the control board is inserted, and one end portions of the motor driving leads and the connector leads are placed in the other aperture of the board housing slot; and the board side leads are provided at a distal end portion of the control board in the insertion direction thereof.

In this case, because the motor driving leads and the connector leads are placed on the distal end portion in the insertion direction of the control board of the board housing slot, when the control board is being housed in the board housing slot, this operation is not obstructed by the motor driving leads and the connector leads. Because of this, housing the control board can be achieved easily.

A fourth aspect of the present invention is a rotary actuator including the electric motor according to the third aspect of the present invention wherein a reduction gear that transmits rotation force from the electric motor to an external output shaft with the rotation rate being reduced is provided on one end portion of the shaft portion of the rotor that constitutes the electric motor; a motor pole detection sensor that detects a rotation of the rotor, an output shaft angle detection sensor that detects a rotation position of the output shaft, and a plurality of sensor leads that are used to electrically connect the motor pole detection sensor and the output shaft angle detection sensor respectively to the control board are fixed inside the housing; and one end portions of the sensor leads are in contact with the control board when the control board is housed in the board housing slot.

According to the above described rotary actuator, by placing one end portions of the sensor leads in contact with the control board when the control board is housed in the board housing slot, it is easy to form electrical connections using solder or the like between the sensor leads and the control board. Moreover, in the same way as is described above, it is possible to prevent the task of assembling other electrical components having an effect on the electrical connection portions. As a result, it is possible to achieve an improvement in the electrical reliability of the rotary actuator. Namely, according to the above described rotary actuator, the second object of the present invention can be achieved.

A fifth aspect of the present invention is an electric motor in which a rotor and a ring-shaped stator core that is positioned so as to encircle the rotor and that has a plurality of stator teeth around which coils are wound are housed inside a housing, wherein the stator core is insert molded in a molded frame portion that constitutes the housing.

According to the above described electric motor, because the task of assembling the stator core inside the housing, which is required in the conventional technology, is rendered unnecessary, it is possible to eliminate assembly errors. Consequently, because there is an improvement in the axial accuracy of the stator core relative to the rotor, it is possible to minimize the air gap between the rotor and the stator core. As a result, it is possible to improve the performance and efficiency of the electric motor. Moreover, by rendering unnecessary the task of assembling the stator core, it is possible to simplify the assembly tasks required to manufacture the electric motor. Namely, according to the above described electric motor, the third object of the present invention can be achieved.

It may be arranged such that the housing is provided with a pair of frame bodies that are placed on both sides of the molded frame portion so as to sandwich the molded frame portion in the axial direction of the stator core, and that respectively support both end portions of the shaft portion of the rotor via bearings, and wherein through holes through which identical reference pins are press-inserted in the axial direction are formed respectively in the molded frame portion and the pair of frame bodies.

In this case, it is possible to easily match the axes of the rotor and stator core simply by accurately forming the reference pins and the through holes without the bearings and the portions of the respective frame bodies where the bearings are mounted having to be set to a particularly high level of accuracy. Because of this, it is possible to easily improve the coaxial accuracy of the electric motor. Accordingly, the air gap between the rotor and the stator core can be minimized even further. As a result, it is possible to improve the performance and efficiency of the electric motor.

It may be arranged such that the motor driving leads that are electrically connected to the coil are insert molded in the molded frame portion, and end portions of the motor driving leads are placed in the vicinity of the stator teeth.

It may be arranged such that the connector leads that are electrically connected to the motor driving leads are insert molded in the molded frame portion.

In this case, by molding the motor driving leads and connector leads together with the stator core integrally with the molded frame portion, it is easy to perform inspections such as conductivity tests of the coil, the motor driving leads, and the connector leads. Furthermore, by molding the motor driving leads integrally with the molded frame portion, the coil can be electrically connected in advance to the other end portions of the motor driving leads prior to the start of the assembly task. Because of this, it is possible to reduce those portions that have to be electrically connected during the assembly task. Namely, it is possible to hold to the minimum the number of electrical contact points during the assembly task. The cumulative effect of this is that it is possible to improve the reliability of the electric motor. Furthermore, the assembly task can be carried out more easily, resulting in it also being possible to improve the manufacturing efficiency of the electric motor.

It may be arranged such that a board housing slot that houses at least a portion of a control board on which an electronic component is mounted is formed in the molded frame portion, and end portions of the motor driving leads and the connector leads extend to the interior of the board housing slot.

In this case, by extending end portions of the motor driving leads and connector leads to the board housing slot, when the control board is housed in the board housing slot, it is easy to electrically connect the motor driving leads and connector leads to the control board.

Moreover, by integrally molding the stator core, the motor driving leads, and the connector leads in the molded frame portion, and also forming the board housing slot in the same molded frame portion, it is possible to reduce the size of the electric motor.

A sixth aspect of the present invention is a rotary actuator including: the electric motor according to the fifth aspect of the present invention; a reduction gear that is located on one end portion of a shaft portion of a rotor that is provided in the electric motor, and transmits rotation force from the electric motor to an external output shaft with the rotation rate being reduced; a motor pole detection sensor that detects a rotation of the rotor; an output shaft angle detection sensor that detects a rotation position of the output shaft; and a plurality of sensor leads that are electrically connected to each of the motor pole detection sensor and the output shaft angle detection sensor, wherein the motor pole detection sensor is placed on the output shaft side in the axial direction of the rotor, and the motor pole detection sensor, the output shaft angle detection sensor and the sensor leads are integrally fixed to a bracket portion that constitutes the housing and is joined to the molded frame portion.

According to the above described rotary actuator, by placing both the motor pole detection sensors and the output shaft angle detection sensor on the output shaft side relative to the rotor, this plurality of sensors can be integrally fixed to the same bracket portion that forms the housing. By integrally fixing this plurality of sensors to the same bracket portion, the task of positioning the plurality of sensors inside the housing is simplified. Moreover, because it is no longer necessary to assemble the sensors individually inside the housing, the assembly tasks required to manufacture the rotary actuator can be simplified.

Furthermore, in the case of this structure, because the respective electrical connections between the motor pole sensors and the output shaft angle detection sensor and the sensor leads can be omitted, it is possible to reduce to a minimum the number of electrical contact points during the assembly task. Accordingly, the assembly task can be carried out easily, resulting in it being possible to improve the manufacturing efficiency of the rotary actuator. Moreover, by integrally fixing the motor pole detection sensors, the output shaft angle detection sensor, and the sensor leads to the same bracket portion, it is possible to improve the electrical reliability and achieve a reduction in the size of the rotary actuator. Namely, according to the above described rotary actuator, the third object of the present invention can be achieved.

BRIEF DESCRIPTION OF THE DRAWINGS

FIG. 11A is a cross-sectional view showing the rotary apparatus of the present embodiment in model form, while

DETAILED DESCRIPTION OF THE INVENTION

A first embodiment of the present invention will be described below with reference to the drawings.

FIG. 1 through FIG. 10 show a first embodiment of the present invention. As is shown in the overall views in FIG. 9 and FIG. 10, a rotary apparatus 1 of the present embodiment is a throttle valve apparatus that is used to adjust an engine intake amount. This rotary apparatus 1 includes a rotary actuator 2 and an output mechanism 4 which has an output shaft 3 (see FIG. 2 and the like) that forms the valve shaft of the throttle valve.

(Rotary Actuator)

Figure 1:
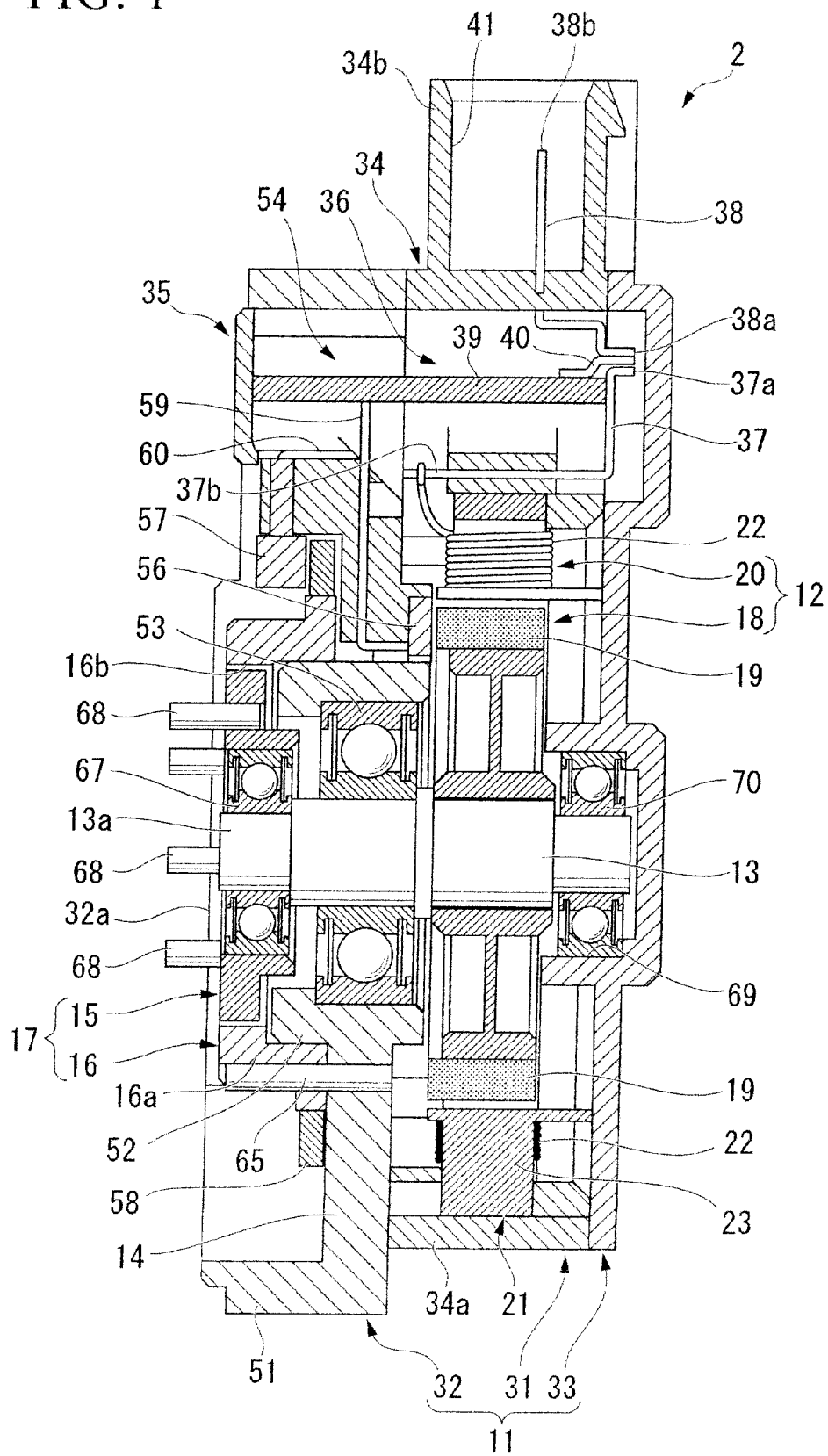
FIG. 1 is a vertical cross-sectional view showing a first embodiment of the rotary actuator of the present invention.
Figure 3:
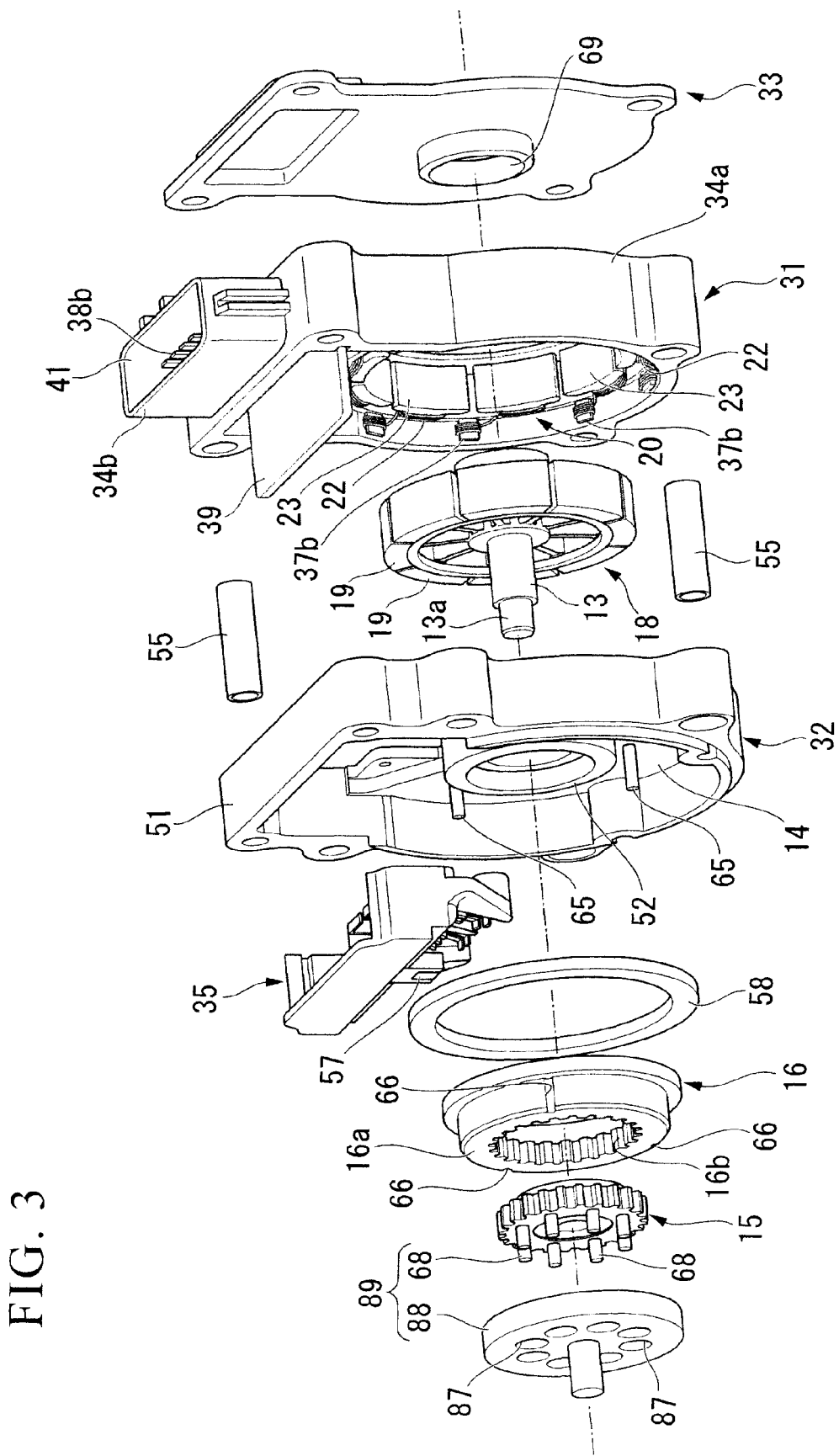
FIG. 3 is an exploded perspective view of the rotary actuator shown in FIG. 1.

In this rotary actuator 2, as is shown in FIG. 1 and FIG. 3, an electric motor 12 is housed inside a housing 11. One end portion of a rotor shaft 13 of this electric motor 12 penetrates a wall (i.e., a flat plate portion 14 which is described below) of the housing 11, and protrudes from an outer surface of the housing 11. A reduction gear 17 that includes an external gear 15 and an internal gear 16 is provided on a protruding end portion 13a of this rotor shaft 13.

In the present embodiment, the electric motor 12 is a surface magnet type of brushless motor. A plurality of magnets 19 are fixed to an outer circumferential surface of a rotor 18 of the electric motor 12 such that the respective N poles and S poles of the magnets 19 alternate in the circumferential direction. Moreover, a stator 20 is provided so as to encircle this rotor 18. In this stator 20, a plurality of stator teeth 23 around which coils 22 have been wound are formed on an inner circumferential portion of a ring-shaped stator core 21 facing radially inwards so as to face the magnets 19 of the rotor 18.

Figure 5:
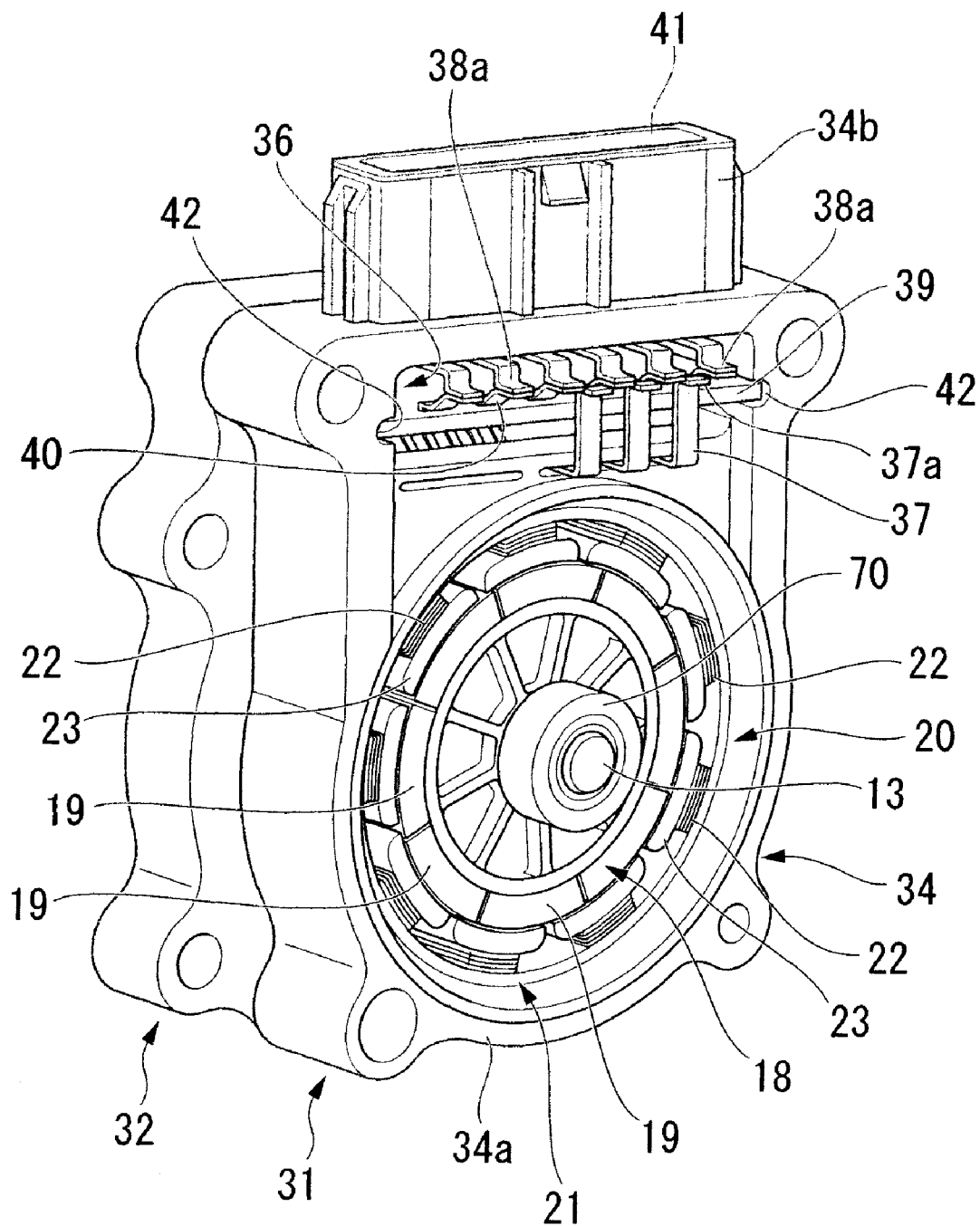
FIG. 5 is a perspective view showing a state in which a cover of the rotary actuator shown in FIG. 1 is open.
Figure 6:
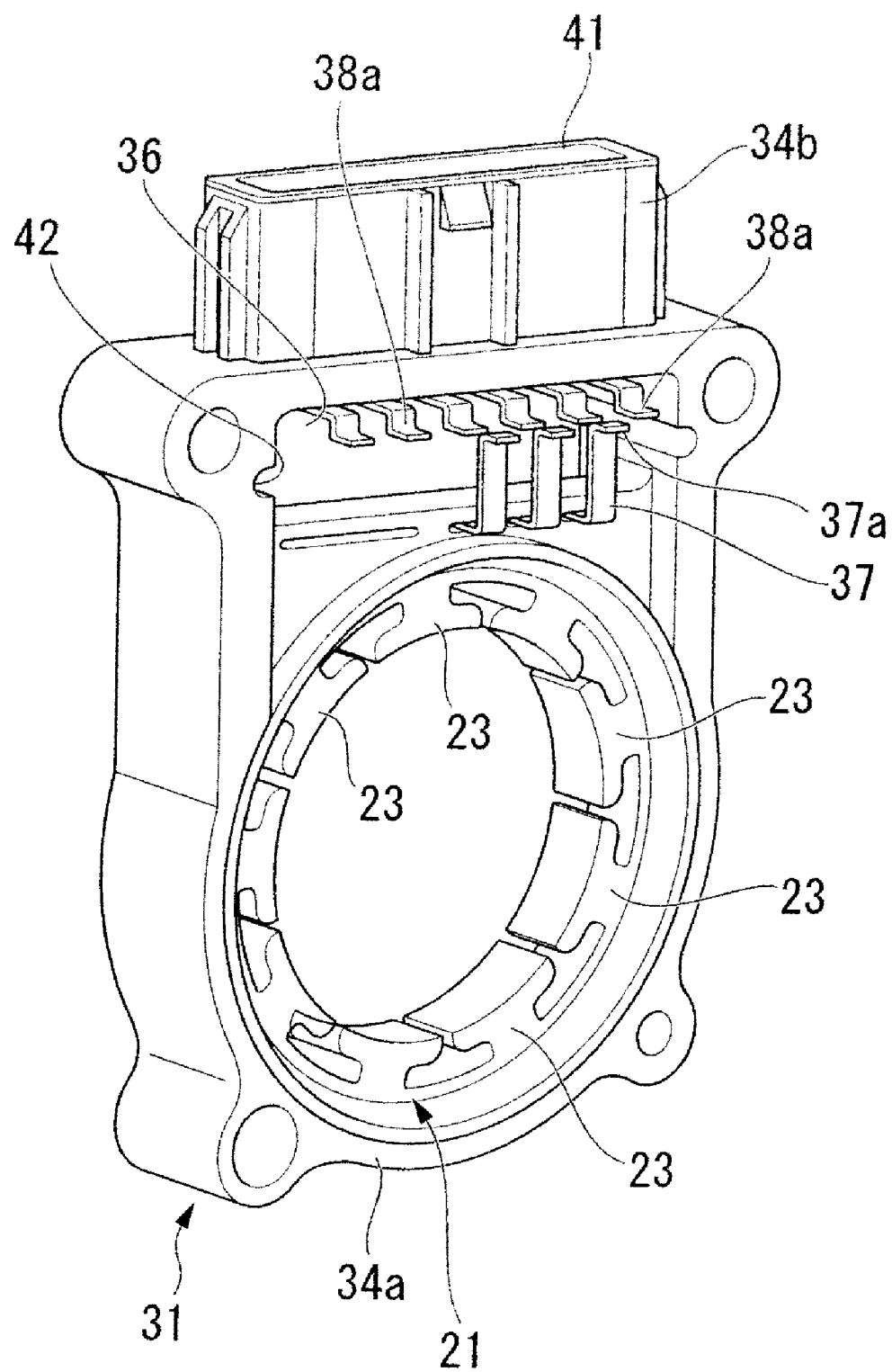
FIG. 6 is a perspective view showing a housing of the rotary actuator shown in FIG. 1.
Figure 7:
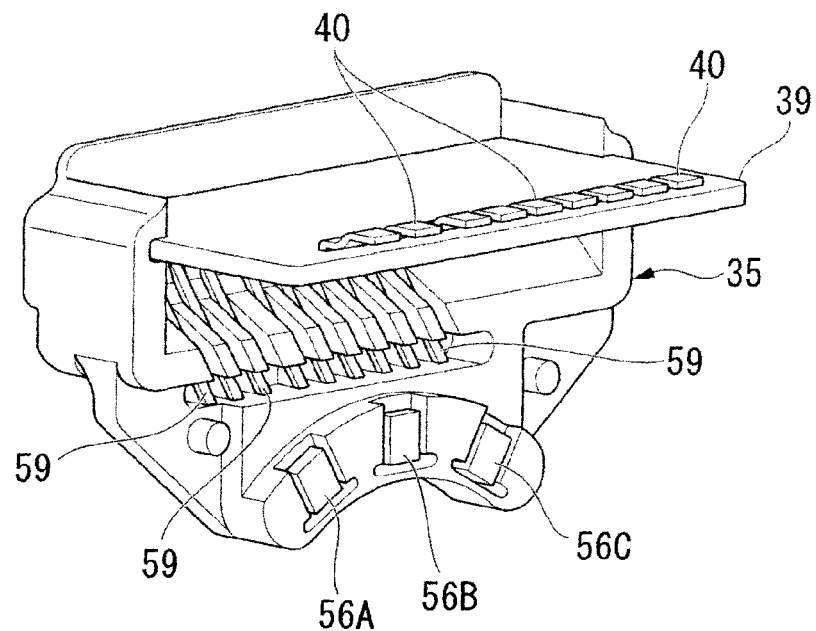
FIG. 7 is a perspective view showing a state in which a bracket and board of the rotary actuator shown in FIG. 1 are assembled.
Figure 8:
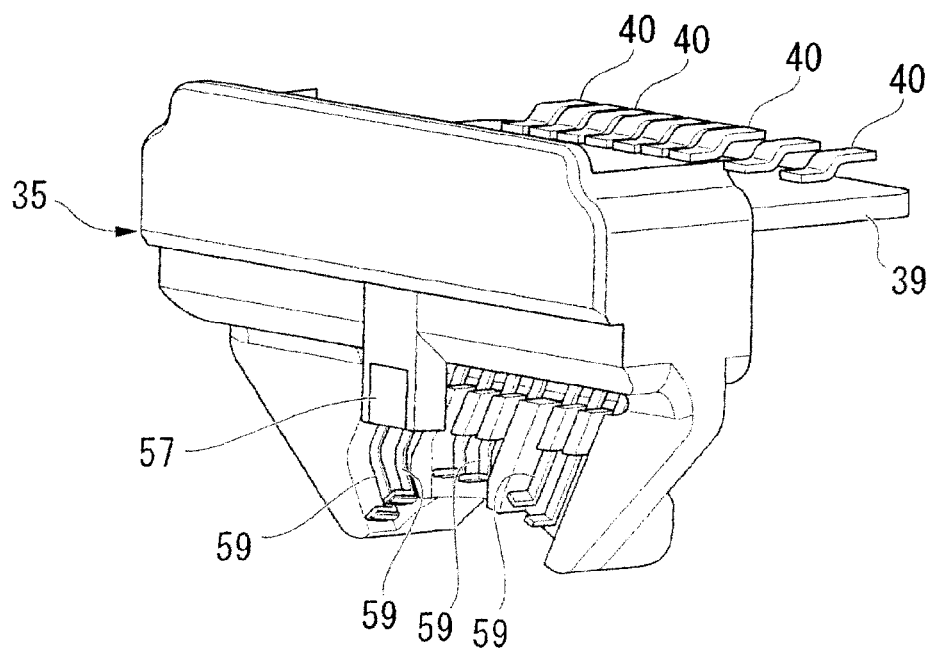
FIG. 8 is a perspective view showing the state shown in FIG. 7 as seen from the opposite side.
Figure 9:
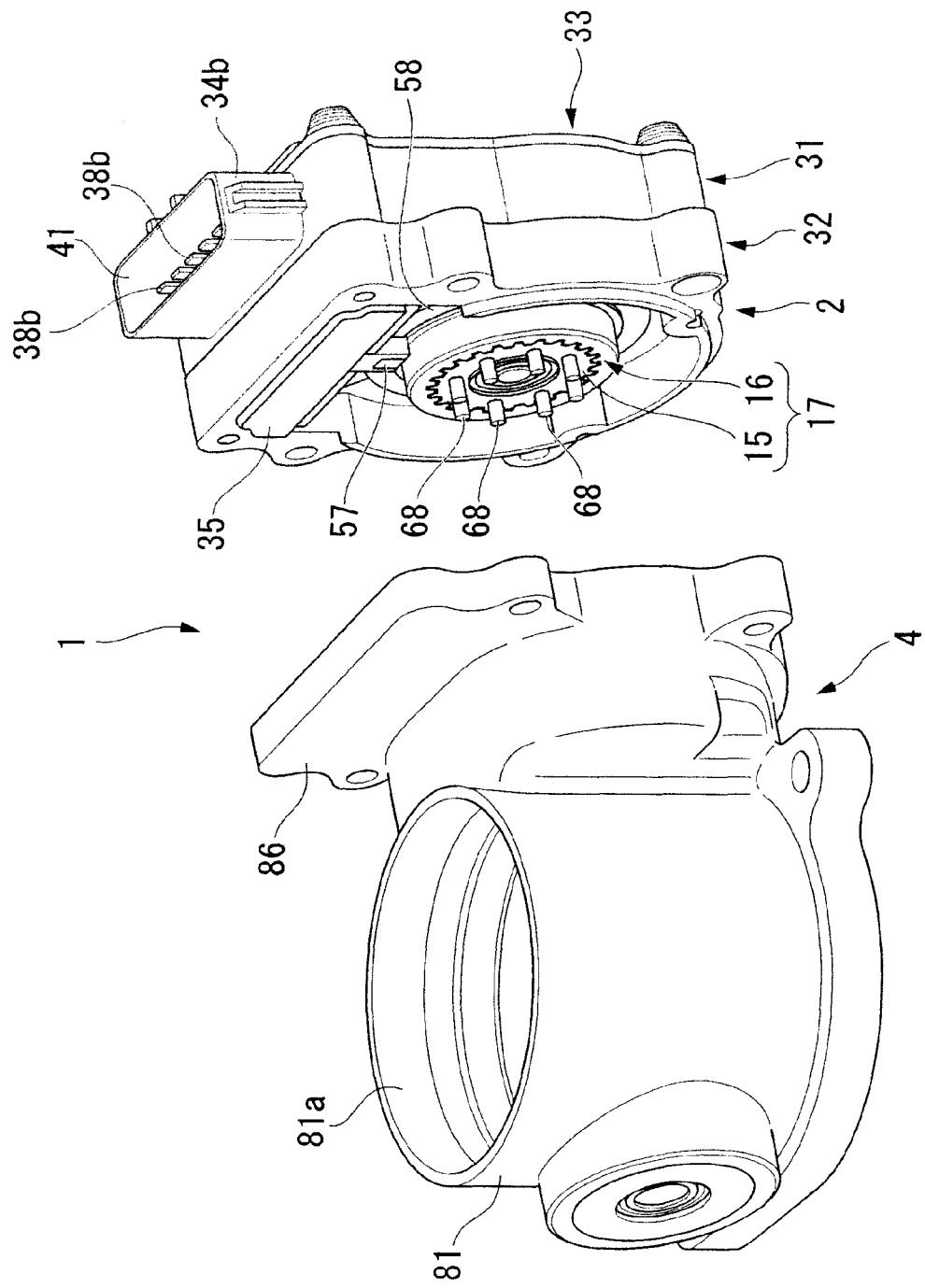
FIG. 9 is a perspective view showing a separated rotary actuator and output mechanism as an embodiment of a rotary apparatus that is formed with the rotary actuator and output mechanism of the present invention.
Figure 10:
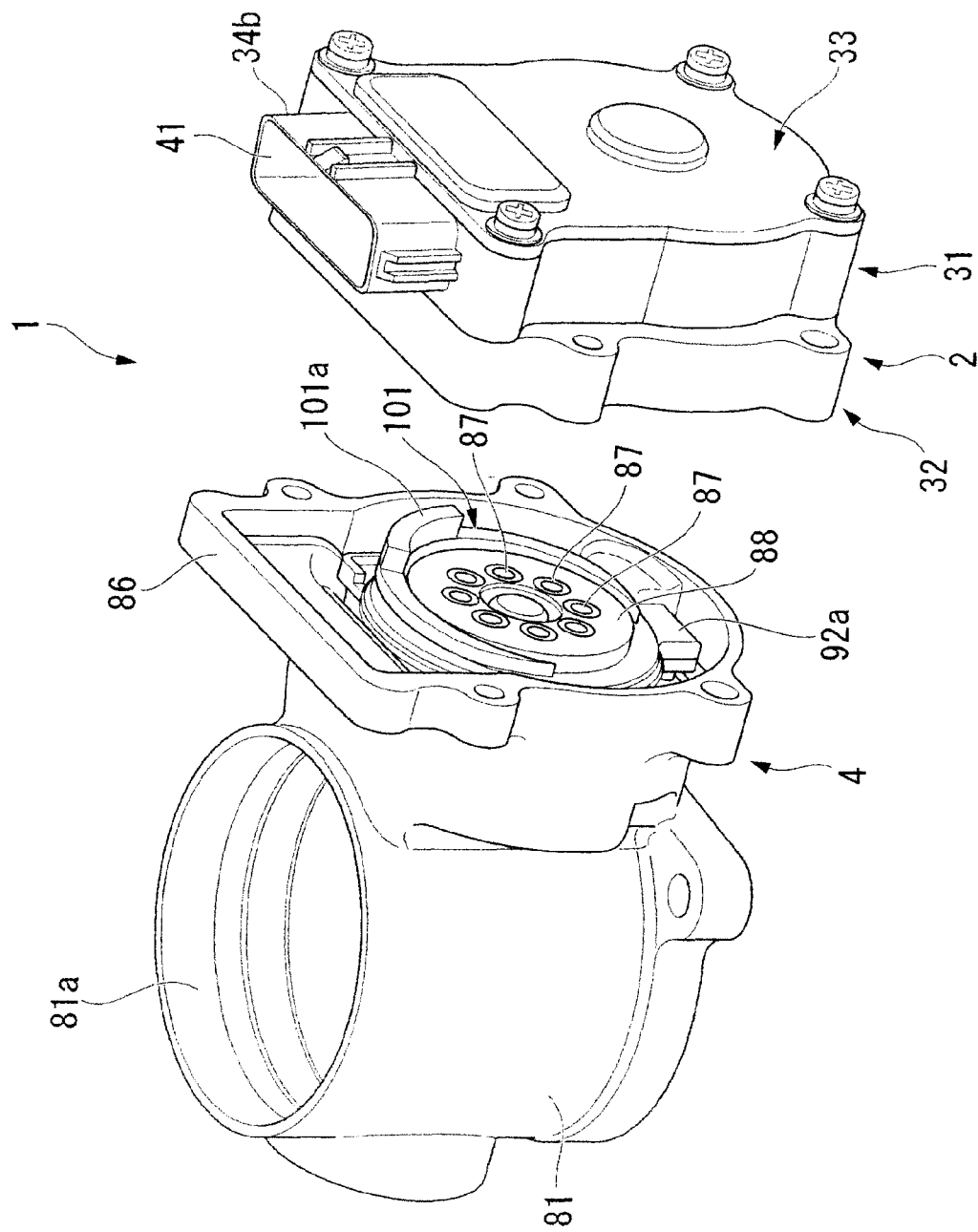
FIG. 10 is a perspective view showing the state shown in FIG. 9 as seen from a different direction.

As is shown in FIG. 3, FIG. 5, and FIG. 6, eight magnets 19 are provided on the outer circumferential surface of the rotor 18.

The housing 11 is assembled by superimposing a housing main body 31, a surface side frame body 32 that is fitted onto one surface of the housing main body 31, and a cover 33 that is fitted onto the other surface of the housing main body 31.

The housing main body 31 further includes an insert molded synthetic resin molded frame portion 34 which is formed by injection molding the stator core 21 of the electric motor 12, and a synthetic resin bracket component 35 that is joined to this molded frame portion 34.

The molded frame portion 34 includes a stator holding portion 34a and a connector portion 34b that are formed as a single unit, and a board housing slot 36. Here, the stator holding portion 34a holds the stator core 21 so as to leave open both ends in the axial direction of the ring-shaped stator core 21 while enclosing the periphery thereof. The connector portion 34b is able to electrically connect the coils 22 and the like that are wound onto the stator core 21 to the outside. The board housing slot 36 is formed between the stator holding portion 34a and the connector portion 34b, and penetrates in parallel with the axial direction of the stator core 21.

One end portions of both a plurality of motor driving leads 37 to which the coil wires of the coils 22 that are wound around the stator teeth 23 of the stator core 21 are connected, and a plurality of connector leads 38 that are located in the connector portion 34b extend respectively into the interior of this board housing slot 36. The motor driving leads 37 and the connector leads 38 are bent inside the board housing slot 36 so as to be parallel with the axial direction of the stator core 21 and so as to also face towards the rear (i.e., in the direction in which the cover 33 is mounted, which is towards the right in FIG. 1). As a result, terminal portions 37a and 38a at one end of the leads 37 and 38 are arranged such that they each form rows. Furthermore, the rows of the terminal portions 37a and 38a are arranged in parallel with each other, and a slight gap is formed between the rows of the two terminal portions 37a and 38a. A row of board side leads 40 which are integral with the board 39 are placed in this gap between the rows of terminal portions 37a and 38a.

Note that, as is shown in FIG. 3, terminal portions 37b at the other end of the motor driving leads 37 are located in the vicinity of the respective stator teeth 23 of the stator core 21. The coil wires of the coils 22 that are wound onto the stator teeth 23 are lifted up to the terminal portions 37b. In contrast, terminal portions 38b at the other end of the connector leads 38 are located inside a recessed connector engaging portion 41 that is formed in the connector portion 34b facing in a direction which is orthogonal to the axial direction of the stator core 21.

The board 39 is used for mounting electronic components and the like that control the driving of the electric motor 12. Both side portions of the board 39 are held by guide grooves 42 that are formed in two inner side surfaces of the board housing slot 36, and the plurality of board side leads 40 are lined up in the surface direction and fixed to the distal end portion of the board 39. Distal end portions of these board side leads 40 protrude from the board 39 in the surface direction. As a result of the board 39 being held in the guide grooves 42 in the board housing slot 36, the row of terminals 40 of the board 39 are inserted between the row of terminal portions 37a and 38a of the two leads 37 and 38 of the molded frame portion 34. These terminal portions 37a and 38a are fixed in a connected state with the board side terminals 40 using solder. In this fixed state, the board 39 is held parallel with the axial direction of the stator core 21.

The surface side frame body 32 is formed from a metal such as aluminum. The surface side frame body 32 is constructed by forming a boss portion 52, which is formed by a short cylindrical body, integrally with an inner side of an outer side frame portion 51, which has the same outer configuration as that of the molded frame portion 34, by means of the flat plate portion 14 that links the boss portion 52 and the outer side frame portion 51. This boss portion 52 is located on the same axis as that of the stator core 21 when the surface side frame body 32 is superimposed on the molded frame portion 34. A bearing 53 which rotatably supports the rotor shaft 13 of the electric motor 12 is fixed to an internal portion of the boss portion 52. In addition, a notch is formed in the flat plate portion 14 in a position that corresponds to the board insertion slot 36 of the molded frame portion 34. A window portion 54 where a rear end portion of the board 39 which is held in the molded frame portion 34 is placed is formed in the flat plate portion 14.

The surface side frame body 32 and the molded frame portion 34 are accurately positioned and combined into a single unit with reference pins 55 (see FIG. 3) that are press-inserted into each. As a result, the stator core 21 of the molded frame portion 34 is placed on the same axis as the bearing 53 inside the boss portion 52 of the surface side frame body 32.

In a state in which the surface side frame body 32 and the molded frame portion 34 are joined together, the rear end portion of the board 39 is exposed via the window portion 54 of the surface side frame body 32. The bracket portion 35 is mounted inside the window portion 54 so as to cover this exposed portion, and is assembled together with the molded frame portion 34 and these are then fixed together. This bracket portion 35 covers the rear end portion of the board 39. An output shaft angle detection sensor 57 and motor pole detection sensors 56 which are formed with a hole element or the like are integrally fixed to the bracket portion 35.

The motor pole detection sensors 56 are positioned such that, when the bracket portion 35 has been inserted through the window portion 54 of the surface side frame body 32 and joined to the molded frame portion 34, they face the magnets 19 of the rotor 18, which is placed inside the stator core 21 of the molded frame portion 34, in the axial direction of the rotor 18. The motor pole detection sensors 56 detect magnetic flux variations of the magnets 19 which move in conjunction with the rotation of the rotor 18, and thereby detect the position in the rotation direction of the magnets 19. Three motor pole detection sensors 56 (56A through 56C in FIG. 7) are fixed at intervals in the circumferential direction.

In contrast, the output shaft angle detection sensor 57 is placed on an angle sensor yoke 58 on the outer surface of the surface side frame body 32 when the bracket portion 35 has been inserted through the window portion 54 of the surface side frame body 32 and joined to the molded frame portion 34. The angle sensor yoke 58 is described below. Sensor leads 59 and 60 that are connected to these sensors 56 and 57 are fixed to the bracket portion 35 so as to be partially embedded therein, and end portions thereof are electrically connected to the board 39.

The internal gear 16 is integrally fixed to the boss portion 52 of the surface side frame body 32. This internal gear 16 is formed having an overall cylindrical shape. Internal teeth 16b are formed on an inner circumferential portion which extends for half the length of a cylindrical portion 16a of the internal gear 16. The boss portion 52 is press-inserted into the remaining half. Grooves 66 that engage with two pins 65 protruding from the flat plate portion 14 of the surface side frame body 32 are formed in an outer circumferential portion of the cylindrical portion 16a. Rotation of the internal gear 16 is prevented when the pins 65 are engaged in the grooves 66. As a result of half of the length of the cylindrical portion 16a being used for press-insertion while the remaining half is used for forming the internal teeth 16b, stress arising from the press-insertion has no effect on the internal teeth 16b.

Moreover, the ring-shaped angle sensor yoke 58 is fitted onto and also fixed to the outer side of the internal gear 16, and the output shaft angle detection sensor 57 is superimposed on one location in the circumferential direction of this angle sensor yoke 58.

The distal end portion of the rotor shaft 13 is rotatably supported by the bearing 53 inside the boss portion 52 of the surface side frame body 32, and protrudes from the outer surface of the boss portion 52. This protruding end portion forms an eccentric shaft portion 13a which is eccentric relative to the center of rotation of the rotor shaft 13. This eccentric shaft portion 13a is placed on the inner side of the internal gear 16. The external gear 15 that meshes with this internal gear 16 is rotatably supported via a bearing 67 on the eccentric shaft portion 13a. The reduction gear 17 is formed with the meshing structure of the two gears 15 and 16. The external gear 15 is rotated around the center axis of the rotor shaft 13 at the same time as it revolves in the circumferential direction of the internal gear 16. The rotation component thereof is reduced relative to the rotation of the rotor shaft 13.

A plurality of connecting pins 68 that are parallel to the rotor shaft 13 are provided at intervals in the circumferential direction on an outer surface of the external gear 15. Distal end portions of these connecting pins 68 protrude onto the outer side from an outer side surface 32a which forms an external mounting surface of the surface side frame body 32.

The cover 33 is mounted on the opposite side of the housing main body 31 from the surface side frame body 32. The cover 33 covers the locations where the board side terminals 40 are connected to the terminal portions 37a and 38a of the board 39, as well as the stator core 21 and the like. A recessed portion 69 is formed in a center portion of the cover 33, and a bearing 70 which rotatably supports an end portion of the rotor shaft 13 is fitted into this recessed portion 69.

(Output Mechanism)

Figure 2:
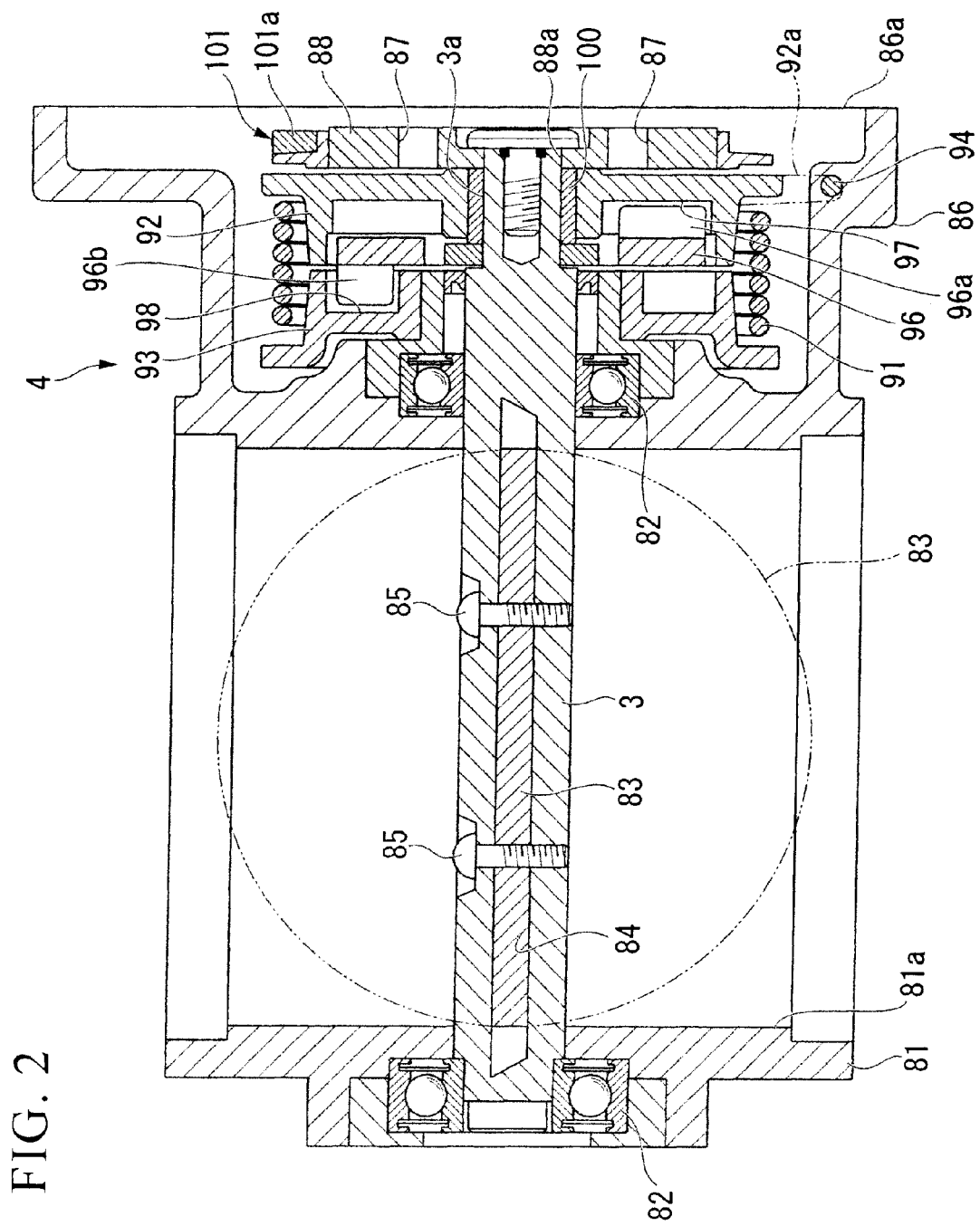
FIG. 2 is a vertical cross-sectional view showing a throttle body as an embodiment of an output mechanism that is driven by the rotary actuator shown in FIG. 1.
Figure 4:
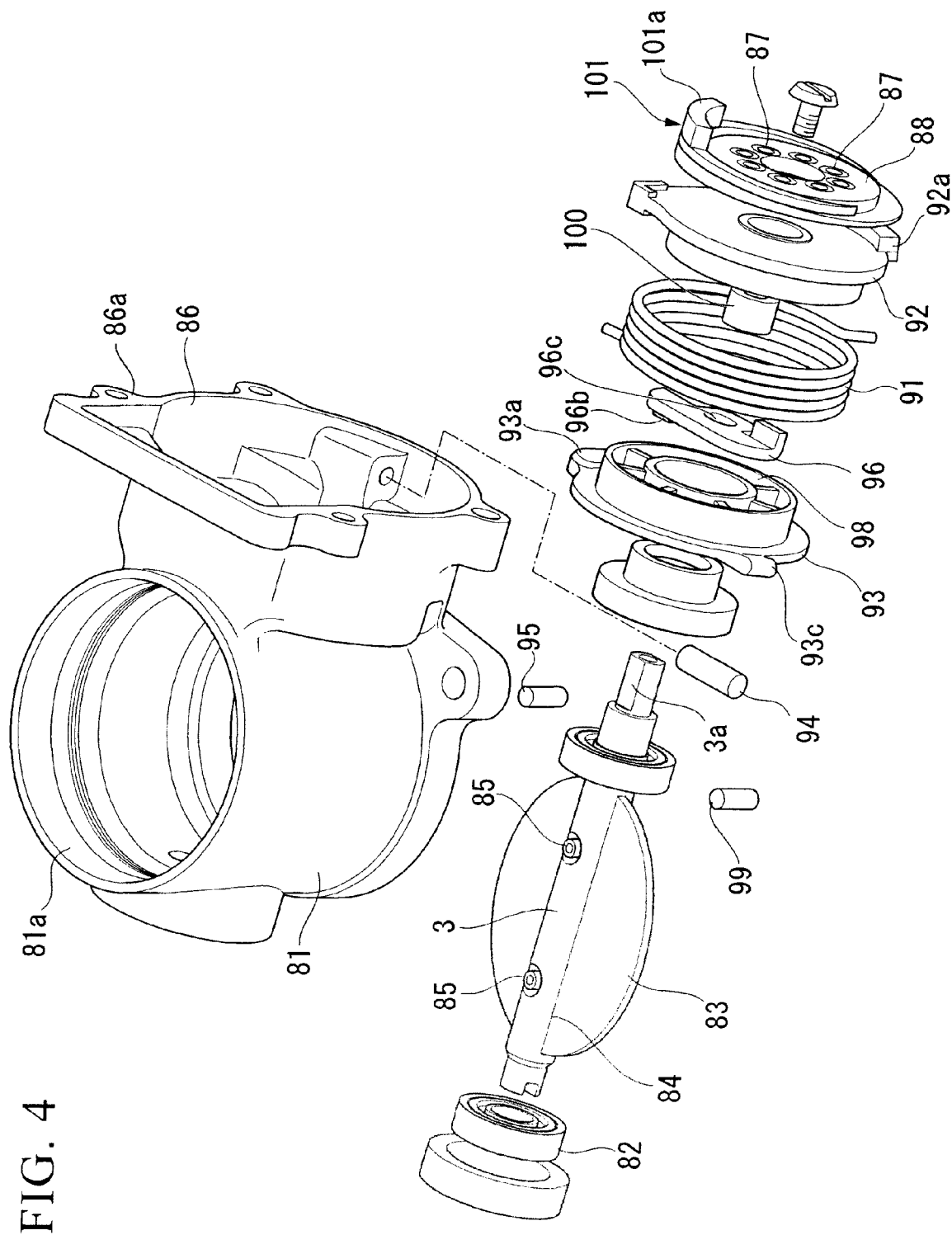
FIG. 4 is an exploded perspective view of the output mechanism shown in FIG. 2.

In contrast, in the present embodiment, the output mechanism 4 is a butterfly type of throttle valve. As is shown in FIG. 2 and FIG. 4, both end portions of an output shaft (i.e., valve shaft) 3 that have been positioned so as to transverse a throttle body (i.e., an output side housing) 81 are rotatably supported via bearings 82 in a wall of the throttle body 81. A plate-shaped valve body 83 is fixed to this output shaft 3. In this case, a slit 84 which extends in the longitudinal direction of the output shaft 3 is formed in the output shaft 3. The valve body 83 is inserted inside the slit 84 and is then fixed in position by screws 85 in a center portion thereof. A case portion 86 which is open to the outside is formed integrally with a side portion of the throttle body 81. The outer side surface 32a of the surface side frame body 32 of the rotary actuator 2 is placed against an outer side surface 86a of the case portion 86, and the two are then fixed together using screws.

One end portion of the output shaft 3 protrudes inside the case portion 86. A circular plate (i.e., an output side transmission portion) 88 is fixed at a right angle to the distal end of the output shaft 3. The circular plate-shaped plate (i.e., output side transmission portion) 88 has holes 87 through which the respective connecting pins 68 of the external gear 15 can be inserted. When the surface side frame body 32 of the rotary actuator 2 is mounted on the case portion 86, the connecting pins 68 of the external gear 15 are connected to the interior of the holes 87 in the plate 88. The holes 87 of the plate 88 are formed having a larger inner diameter than the outer diameter of the connecting pins 68. As a result, eccentric motion of the eccentric shaft portion 13a (i.e., revolution motion of the external gear 15) is absorbed, and only the rotation component of the external gear 15 is transmitted. Namely, the connecting pins 68 of the external gear 15 and the plate 88 which includes the holes 87 form transmission portions which are used to transmit drive force from the rotary actuator 2 to the output mechanism 4. These two transmission portions are assembled together so as to create a transmission unit 89.

Moreover, a return spring 91 that includes a coil spring that biases the output shaft 3 in a direction in which it seals the valve body 83 is provided between an inner wall of the case portion 86 of the output mechanism 4 and the output shaft 3. Both end portions of this return spring 91 are held in a set of holding components 92 and 93 that are placed at an interval in the longitudinal direction of the output shaft 3. The holding components 92 and 93 are both shaped as circular disks, and have protruding portions 92a and 93a that each face outwardly in the radial direction. Stopper portions 94 and 95 that come up against the protruding portions 92a and 93a and restrict the restore position of the return spring 91 are formed in an inner wall of the case portion 86.

Moreover, an arm component 96 that is fixed to the output shaft 3 is provided between the two holding components 92 and 93. Protruding pieces 96a and 96b that engage respectively with circular arc grooves 97 and 98 (in FIG. 4 only the circular arc groove 98 of the one holding component 93 is shown) of the respective holding components 92 and 93 are formed on the arm component 96. The arm component 96 is fitted between the holding components 92 and 93 such that the respective protruding pieces 96a and 96b are positioned within the circular arc grooves 97 and 98 of the holding components 92 and 93.

In this case, the output shat 3 is rotatably inserted through the two holding components 92 and 93. A key portion 3a having a square cross-section is formed on the distal end portion of the output shaft 3. The holes 88a and 96c in the plate 88 and the arm component 96 through which the output shaft 3 is inserted are also formed in a square shape. By fitting the key portion 3a into these holes 88a and 96c, the output shaft 3, the plate 88, and the arm component 96 are fixed as a single body.

From a state in which the protruding portions 92a and 93a of the respective holding components 92 and 93 are in contact with the stoppers 94 and 95, relative rotation between the output shaft 3 and the respective holding components 92 and 93 is allowed within the angular range of the circular arc grooves 97 and 98. Moreover, as a result of the protruding pieces 96a and 96b of the arm component 96 anchoring terminal portions of the circular arc grooves 97 and 98, the output shaft 3 and the respective holding components 92 and 93 are rotated as a single body.

In the examples shown in FIG. 2 and FIG. 4, when the valve body 83 is closed, the protruding portion 92a of the holding component 92 on the distal end side of the output shaft 3 is pressed against the stopper 94 by the biasing force from the return spring 91. When the valve body 83 is driven to rotate in a direction in which it opens, the arm component 96 is rotated in resistance to the biasing force of the return spring 91 while anchoring the holding component 92. In contrast, both when the valve body 83 is closed and also when it is open, the protruding portion 93a of the other holding component 93 is held by the biasing force of the return spring 91 in a state of contact with the stopper 95.

Note that when the valve body 83 is closed, the valve body 83 does not completely seal a flow path 81a of the throttle body 81, and a small gap remains. A protruding portion 93c and a stopper 99 that restrict the rotation position of the holding component 93 in a closed state are separately provided. As a result of the respective stoppers 94, 95, and 99 being formed by screw components, fine adjustments can be made to the positions thereof.

When the output shaft 3 is driven to rotate by the rotary actuator 2, the arm component 96 which is integral with the output shaft 3 is rotated, while anchoring the holding component 92, in a direction in which the protruding portion 92a moves away from the stopper portion 94. By terminating the driving force, the protruding portion 92a is restored by the biasing force of the return spring 91 to a position where it is in contact against the stopper portion 94.

Note that the symbol 100 in FIG. 2 and FIG. 4 indicates a collar through which the key portion 3a is inserted that enables the holding component 93 to rotate freely.

A circular arc magnet 101 which has the same diameter as that of the ring-shaped angle sensor yoke 58 of the rotary actuator 2 is fixed extending in the circumferential direction on an outer circumferential portion of the plate 88. When the rotary actuator 2 is incorporated in the output mechanism 4, the circular arc magnet 101 is positioned so as to face the angle sensor yoke 58. By forming a center portion in the circumferential direction of the circular arc magnet 101 with the greatest thickness, a raised portion 101a which protrudes to the maximum height from the surface of the plate 88 is formed on the circular arc magnet 101. The circular arc magnet 101 is formed such that the thickness thereof becomes gradually thinner moving outwards in the circumferential direction from the raised portion 101a. When the surface side frame body 32 of the rotary actuator 2 is assembled in the case portion 86 of the output mechanism 4, the output shaft angle detection sensor 57 which is located on the angle sensor yoke 58 is interposed between the angle sensor yoke 58 and the circular arc magnet 101. The output shaft angle detection sensor 57 is able to detect the output shaft angle from the magnetic flux variations that accompany a rotation of the circular arc magnet 101.

In the rotary apparatus 1 that is constructed in this manner, if the electric motor 12 of the rotary actuator 2 is driven, the eccentric shaft portion 13a at the end portion of the rotor shaft 13 performs eccentric rotations in conjunction with the rotation of the rotor shaft 13. As a result, the external gear 15 which meshes with the internal gear 16 is rotated while revolving along the internal gear 16. Because the connecting pins 68 that protrude from this external gear 15 are engaged in the holes 87 of the plate 88 of the output mechanism 4, the rotation force of the external gear 15 is transmitted to this plate 88. Because gaps are provided between the holes 87 in the plate 88 and the connecting pins 68 of the external gear 15, the revolution component of the external gear 15 is absorbed within this gap and only the rotation component is transmitted to the plate 88. In this case, the rotation force from the electric motor 12 is transmitted to the plate 88 with the rotation rate being reduced because of the functioning of the reduction gear 17 which includes the external gear 15 and the internal gear 16, so that the output shaft 3 that is connected to the plate 88 is pivoted thereby enabling the valve body 83 to be opened or closed.

The driving of the motor to open or close the valve is controlled in accordance with the position of the rotor 18 which is determined based on detection results from the motor pole detection sensors 56. Furthermore, the valve body 83 is opened or closed appropriately while feedback control of the driving to open or close the valve body 83 is performed based on detection results from the output shaft angle detection sensor 57.

According to the rotary apparatus 1 having the above described structure, only two shaft portions, namely, the rotor shaft 13 and the eccentric shaft portion 13a which is integral with the rotor shaft 13 are provided in the rotary actuator 2. Accordingly, it is only necessary to provide a total of three bearings to receive the shaft portions 13 and 13a, namely the bearing 53 that is placed inside the boss portion 52 of the surface side frame body 51, the bearing 70 that is placed inside the recessed portion 69 of the cover 33 that is used to support the rotor shaft 13, and the bearing 67 that supports the external gear 15 that is provided on the eccentric shaft portion 13a at the distal end of the rotor shaft 13.

In contrast, in the output mechanism, there is only one shaft portion, namely, the output shaft (i.e., the valve shaft) 3, and two bearings 82 that support the output shaft 3. Accordingly, in the rotary apparatus 1 as a whole, there are a total of three shaft portions (12, 13a, 3) and five bearings (53, 70, 67, 82, 82) so that, compared with the structure of a conventional example, the number of shaft portions and bearings have been reduced respectively by one.

Figure 11A:
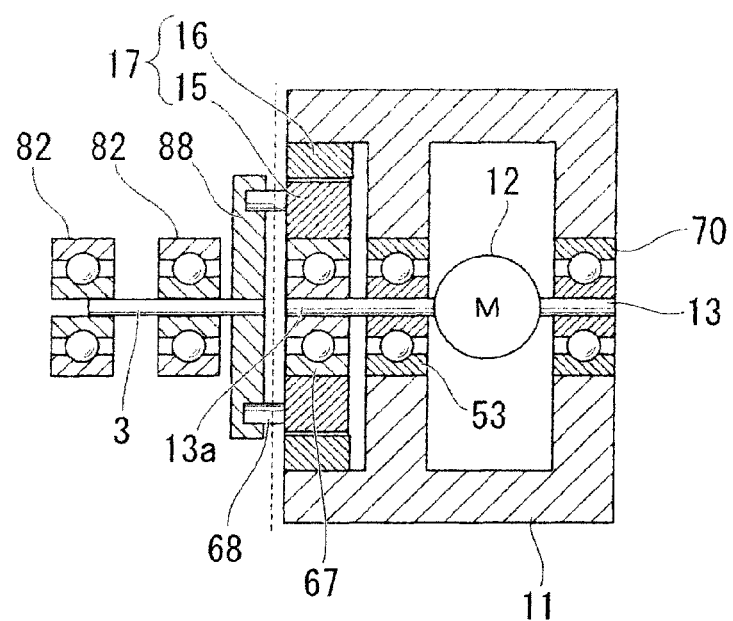
Figure 11B:
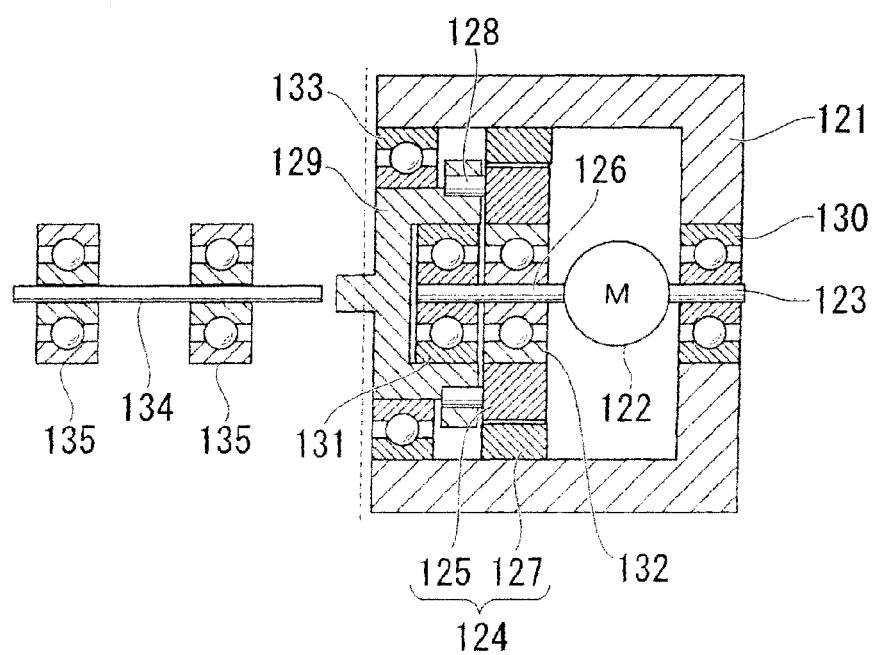
FIG. 11B is a cross-sectional view showing a conventional example of a rotary apparatus in model form.

FIG. 11A and FIG. 11B show in typical form a comparison when this structure is compared with the structure of a conventional example. FIG. 11A shows the present embodiment, while FIG. 11B shows the structure of a conventional example.

In the case of the conventional example shown in FIG. 11B, a total of three shaft portions are provided, namely, a rotor shaft 123 of a motor 122 in a housing 121, an eccentric shaft 126 that supports an external gear 125 of the reduction gear 124, and a second shaft 129 to which revolutions of the eccentric shaft 126 are transmitted via connecting pins 128 due to the meshing of the eccentric shaft 126 with the internal gear 127. The rotor shaft 123 is supported by a bearing 130 which is fixed in the housing 121 and a bearing 131 inside the second shaft 129. The external gear 125 is rotatably supported relative to the eccentric shaft 126 by a bearing 132. This second shaft 129 is rotatably supported in the housing 121 via a bearing 133. Moreover, on the output mechanism side, an output shaft 134 is rotatably supported by a pair of bearings 135. Namely, in the case of a conventional example, a total of four shaft portions, namely, the rotor shaft 123, the eccentric shaft 126, the second shaft 129, and the output shaft 134, as well as a total of six bearings to support these shafts indicated in the drawing by the symbols 130, 131, 132, 133, 135, and 135 are required. In contrast to this, in the case of the present embodiment shown in FIG. 11A, because three shaft portions and five bearings are provided, it is clear that the number of components has been reduced.

Moreover, in the case of the conventional example, because the shaft portion 129 having a dual structure is provided, the rotor shaft 123 has a dual bearing structure. In contrast, in the case of the present embodiment, both end portions of the rotor shaft 13 are reliably supported in the housing 11 by the respective independent bearings 53 and 70, so that the axial center of the rotor shaft 13 can be accurately positioned and there is no vibration or the like when it is being rotated. In other words, it is possible to use a small air gap between the rotor 18 and the stator 20 of the electric motor 12, resulting in an electric motor having a superior performance and superior efficiency being provided.

Namely, in this rotary apparatus 1, structural components as far as the connecting pins 68 of the external gear 15 are incorporated in the rotary actuator 2, while component elements downstream from the plate 88 that engages with these connecting pins 68 are incorporated in the output mechanism 4. As a result, a structure is formed that enables the rotary actuator 2 and the output mechanism 4 to be separated between the connecting pins 68 and the plate 88. As a result, it is possible to achieve both a reduction in the number of components as well as a superior performance and superior efficiency.

Moreover, the housing 11 of the rotary actuator 2 includes three elements, namely, the housing main body 31, the surface side frame body 32, and the cover 33. The reduction gear 17 which includes the external gear 15 and the internal gear 16 is positioned on the outer surface side of the flat plate portion 14 of this surface side frame body 32. The electric motor 12 is placed on the inner surface side which is on the opposite side of the flat plate portion 14. As a result, the reduction gear 17 and the electric motor 12 are separated by the flat plate portion 14. In this case, the bearing 53 of the rotor shaft 13 that is fixed to the center boss portion 52 of the flat plate portion 14 can be constructed with a sealing mechanism. Furthermore, even when lubrication oil is used in the reduction gear 17, it is possible to maintain a state in which oil is prevented from having any effect on the electric motor 12. As a result, it is possible to improve durability and reliability even when a heavy load is being handled.

Note that the rotary actuator and the rotation apparatus in which this rotary actuator is applied of the present invention are not limited solely to the structure described in the embodiment above. Various modifications can be made to the structure of the rotation device insofar as they do not depart from the spirit or scope of the present invention. For example, in the above described embodiment, pins are provided in the external gear, and holes are formed in the plate of the output mechanism, however, it is also possible, conversely, to form holes in the external gear and form protruding pins on the plate.

Figure 12:
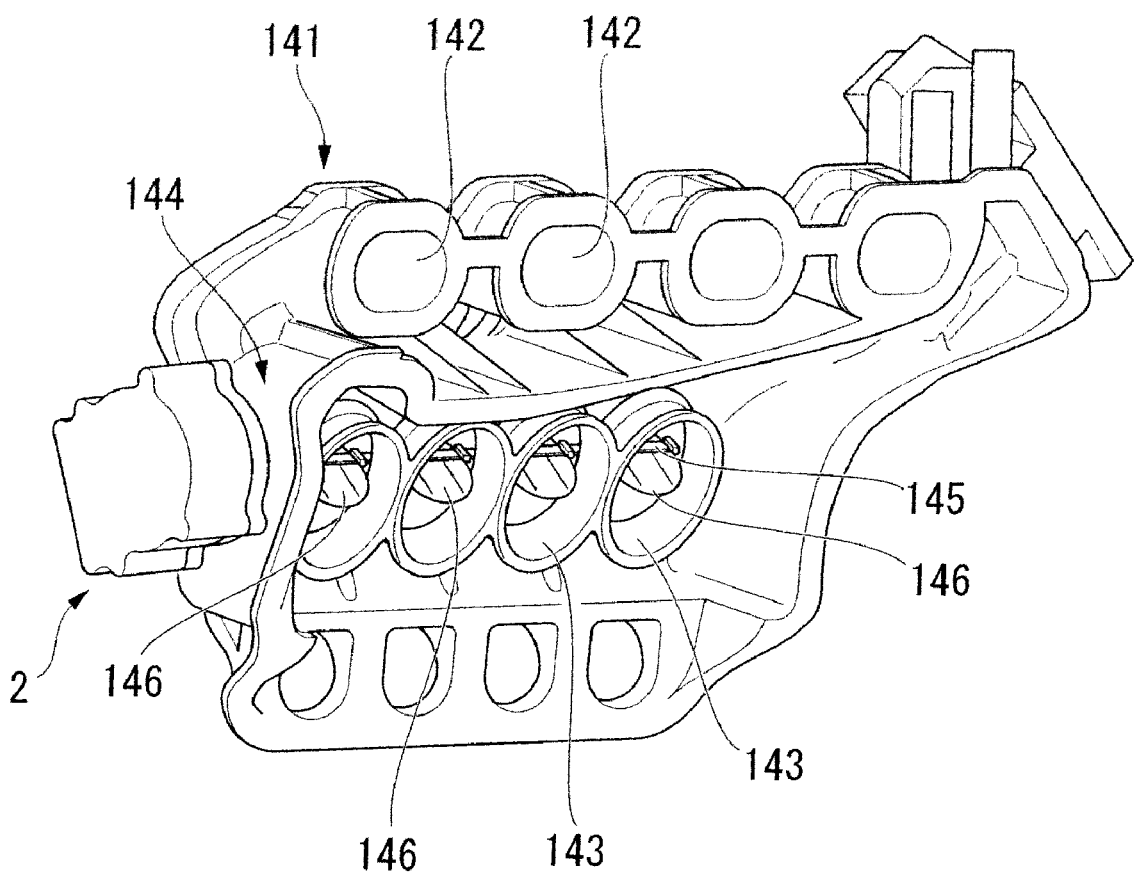
FIG. 12 is a perspective view showing an example in which, as another embodiment of a rotary apparatus in which the rotary actuator shown in FIG. 1 has been applied, the rotary apparatus is applied to a drive apparatus for a line switching valve of a variable intake apparatus.

Moreover, in the example of the present embodiment, an example is illustrated in which the rotary apparatus of the present invention is applied to a throttle valve apparatus, however, it can also be applied to the variable intake valve apparatus shown in FIG. 12.

In the case of this rotary apparatus 141, a line switching valve which switches between a main intake line 142 and an auxiliary intake line 143 of this rotary apparatus 141 forms an output mechanism 144, and a plurality of valve bodies 146 are fixed to an output shaft 145 of this output mechanism 144. The rotary actuator 2 is applied as a mechanism to drive this output shaft 145. A rotary actuator having the same structure as that described in the first embodiment above is used for this rotary actuator 2, while the output mechanism 144 has the same structure as the output mechanism of the above described embodiment except for the fact that a plurality of valve bodies 146 are provided consecutively on the output shaft 145.

A second embodiment of the present invention will now be described below with reference to the drawings.

Figure 19:
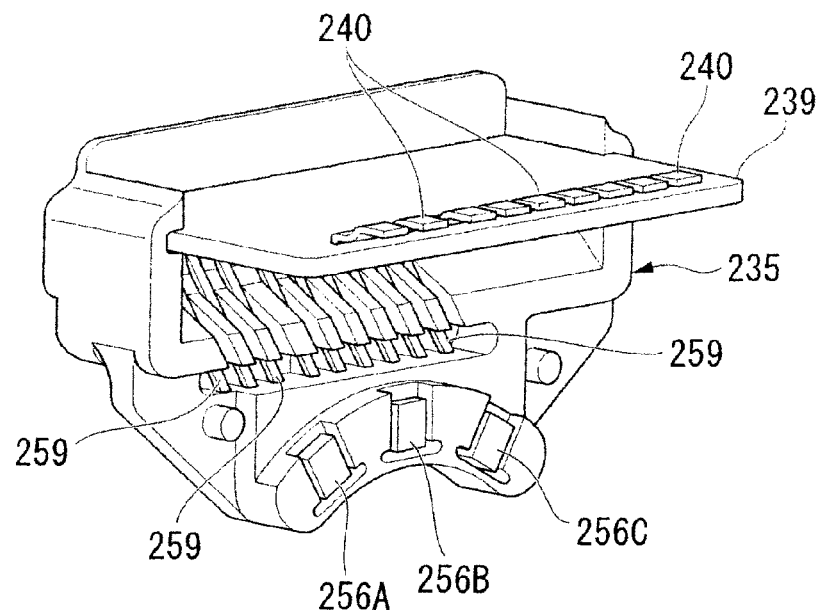
FIG. 19 is a perspective view showing a state in which a control board is incorporated in a bracket portion of the rotary actuator shown in FIG. 13.
Figure 20:
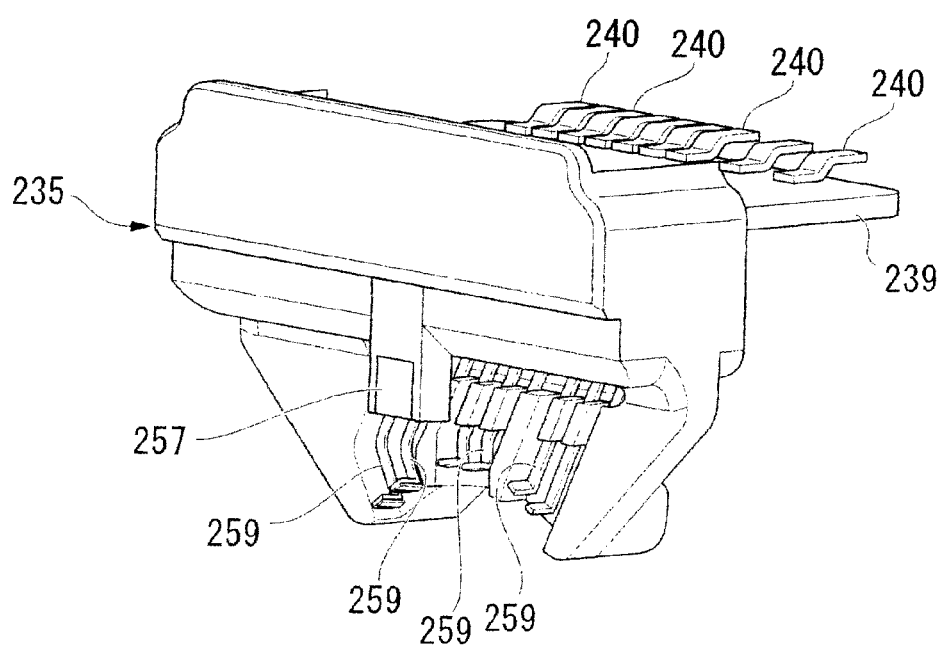
FIG. 20 is a perspective view showing the state shown in FIG. 19 as seen from the opposite side.
Figure 21:
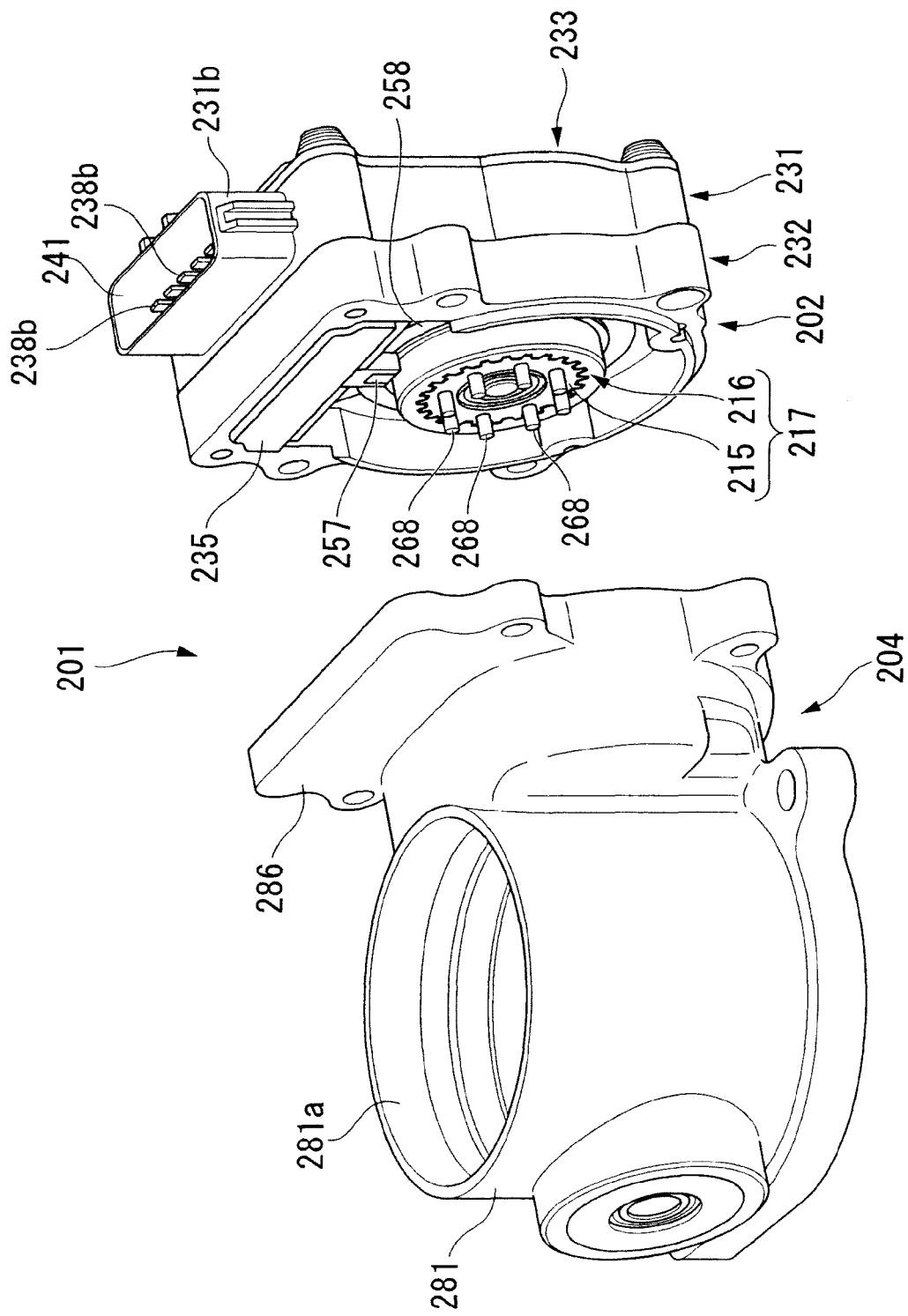
FIG. 21 is a perspective view showing a separated rotary actuator and output mechanism as an embodiment of a rotary apparatus that is formed with the rotary actuator and output mechanism of the present invention.
Figure 22:
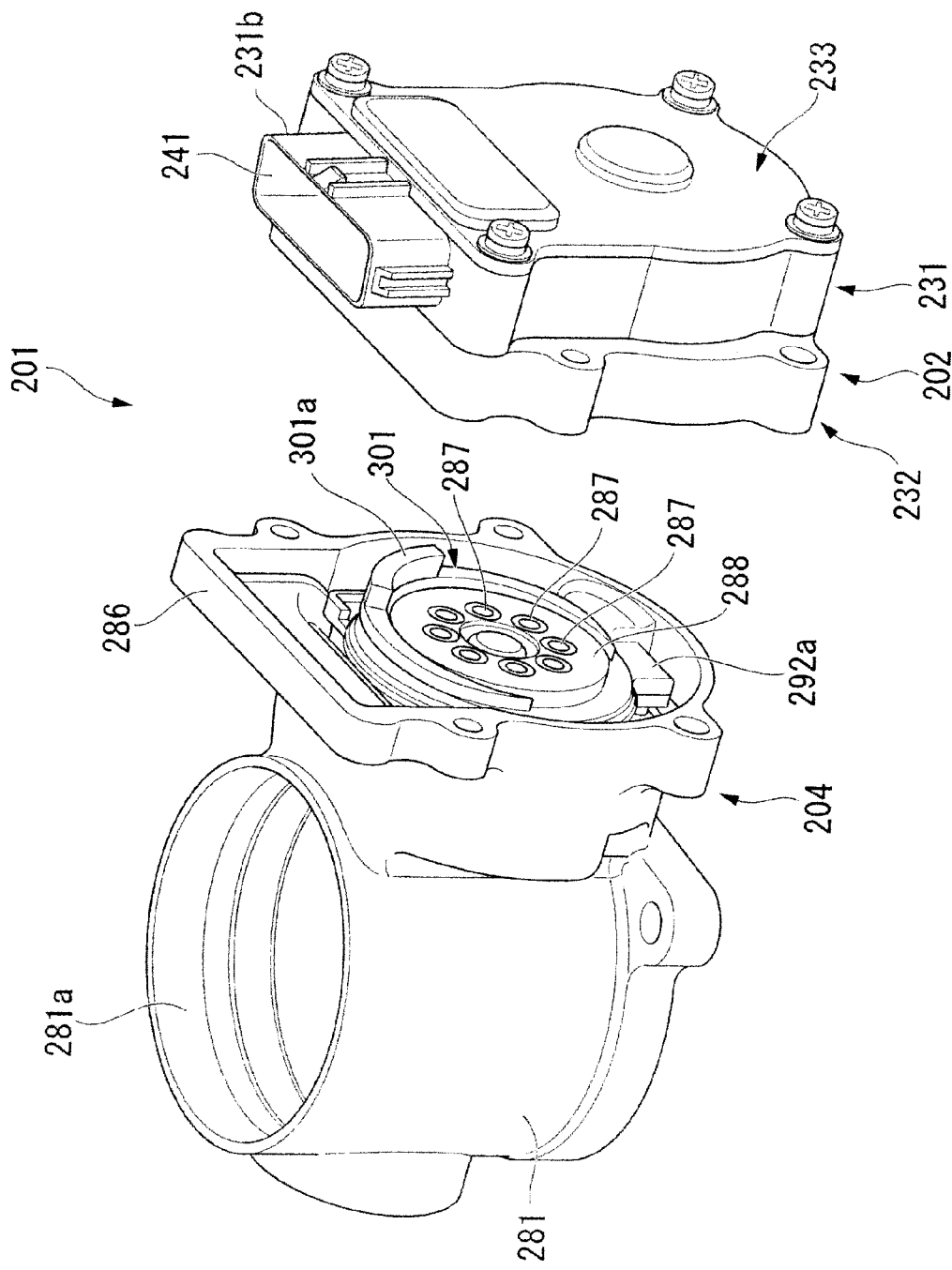
FIG. 22 is a perspective view showing the state shown in FIG. 21 as seen from a different direction.

FIG. 13 through FIG. 22 show the second embodiment of the present invention. As is shown in FIG. 21 and FIG. 22, a rotary actuator 202 of the present embodiment includes an output mechanism 204 which has an output shaft 203 (see FIG. 14 and the like) that forms the valve shaft of the throttle valve and a throttle valve device (rotary apparatus) 201 that is used to adjust an engine intake amount.

(Rotary Actuator)

Figure 13:
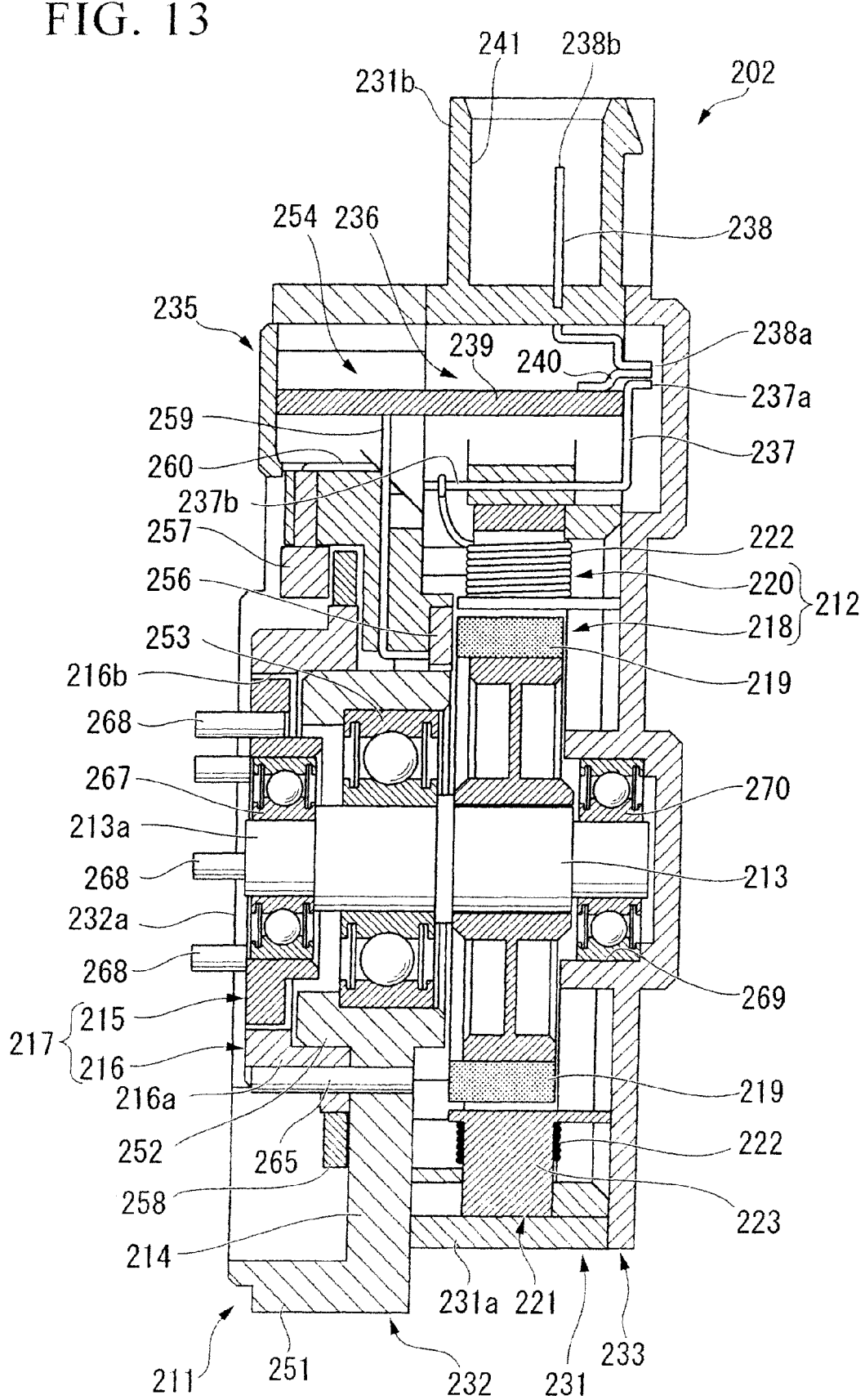
FIG. 13 is a vertical cross-sectional view showing a second embodiment of the rotary actuator of the present invention.
Figure 15:
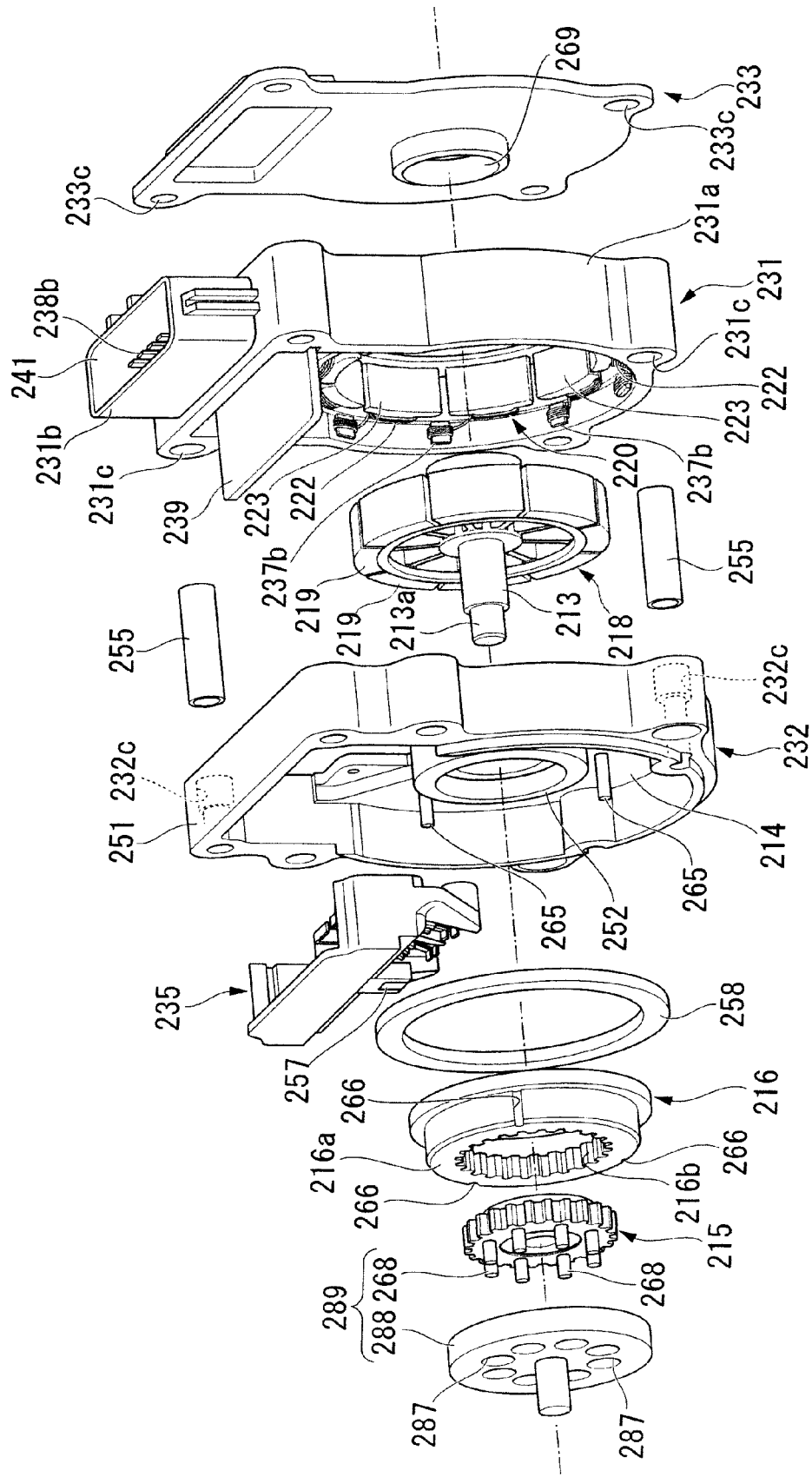
FIG. 15 is an exploded perspective view of the rotary actuator shown in FIG. 13.

In this rotary actuator 202, as is shown in FIG. 13 and FIG. 15, an electric motor 212 is housed inside a housing 211. One end portion of a rotor shaft 213 (i.e., a shaft portion of a rotor 218 which is described below) of this electric motor 212 penetrates a wall (i.e., a flat plate portion 214 which is described below) of the housing 211, and protrudes from an outer surface of the housing 211. A reduction gear 217 that includes an external gear 215 and an internal gear 216 is provided on a protruding end portion 213a of this rotor shaft 213.

In the present embodiment, the electric motor 212 is a surface magnet type of brushless motor. A plurality of permanent magnets 219 are fixed to an outer circumferential surface of a rotor 218 of the electric motor 212 such that the respective N poles and S poles of the magnets 219 alternate in the circumferential direction. Moreover, a stator 220 is provided so as to surround this rotor 218. This stator 220 is provided with a ring-shaped stator core 221 that has a plurality of stator teeth 223 formed on an inner circumferential portion thereof facing inwardly in the radial direction, and coils 222 that are wound around each one of the stator teeth 223. The plurality of stator teeth 223 are positioned so as to face the permanent magnets 219 of the rotor 218.

Figure 17:
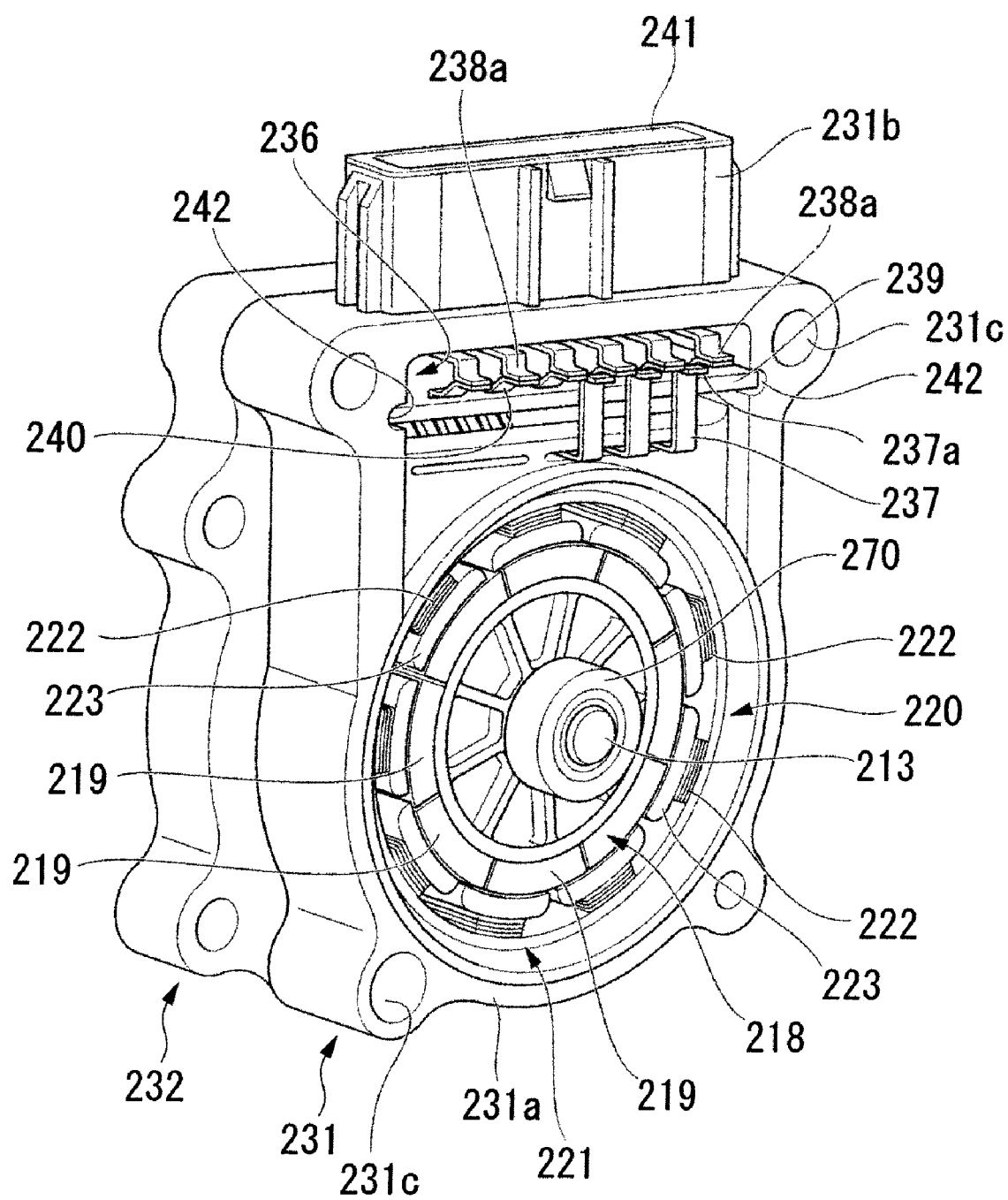
FIG. 17 is a perspective view showing a state in which a cover of the rotary actuator shown in FIG. 13 is open.
Figure 18:
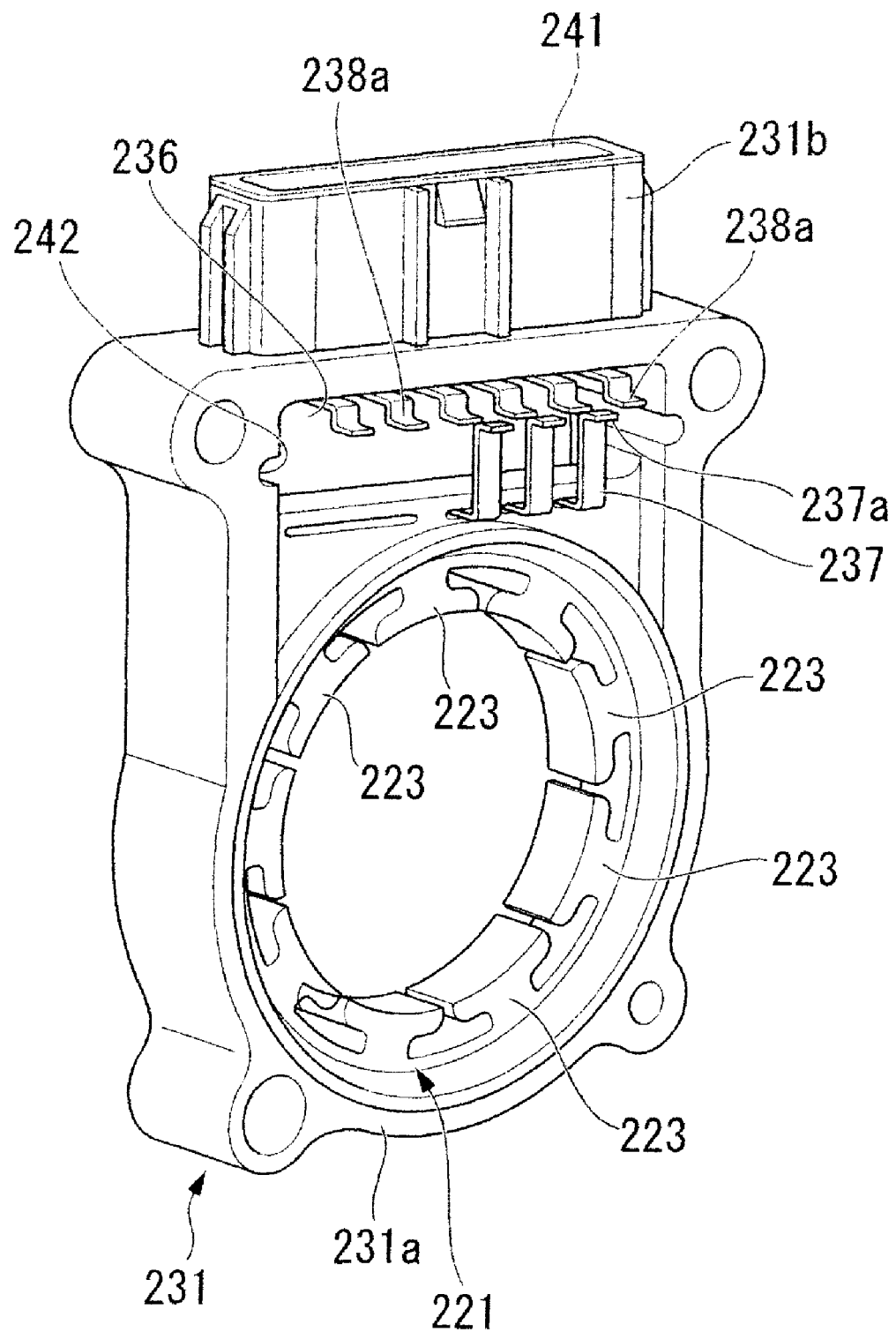
FIG. 18 is a perspective view showing a molded frame portion of the rotary actuator shown in FIG. 13.

As is shown in FIG. 15, FIG. 17, and FIG. 18, eight permanent magnets 219 are provided on the outer circumferential surface of the rotor 218. In addition, nine stator teeth 223 are formed facing the outer circumferential surface of the rotor 218.

The housing 211 is provided with a molded frame portion (i.e., a housing main body) 231, a surface side frame body 232 that is fitted onto one surface of the molded frame portion 231, a cover 233 that is fitted onto the other surface of the molded frame portion 231, and a bracket portion 235 that is joined to the molded frame portion 231.

Here, the surface side frame body 232 and the cover 233 are positioned so as to sandwich the molded frame portion 231 from the axial direction of the stator core 221. The molded frame portion 231, the surface side frame body 232, and the cover 233 are assembled by being superimposed in this axial direction. The molded frame portion 231 and the bracket portion 235 are formed from synthetic resin. The stator core 221 of the electric motor 212 is insert molded in the molded frame portion 231 by injection molding.

As is shown in FIG. 13, FIG. 15, FIG. 17, and FIG. 18, the molded frame portion 231 includes a stator holding portion 231a and a connector portion 231b that are formed as a single body, and a board housing slots to 236. Here, the stator holding portion 231a holds the stator core 221 so as to leave open both ends in the axial direction of the ring-shaped stator core 221 while enclosing the periphery thereof. The connector portion 231b is able to electrically connect the coils 222 and the like that are wound onto the stator core 221 to the outside. The board housing slot 236 is formed between the stator holding portion 231a and the connector portion 231b, and penetrates in parallel with the axial direction of the stator core 221.

One aperture of this board housing slot 236 (i.e., the aperture on the side thereof where the surface side frame body 232 is mounted) forms and insertion aperture into which a control board 239 is inserted, and is formed so as to house a portion of the control board 239. Namely, the control board 239 is placed on an outer circumferential side of the stator core 221 in a state in which the control board 239 is housed in the board housing slot 236.

One end portions of both a plurality of motor driving leads 237 that are electrically connected to the coil wires of the coils 222 that are wound around the respective stator teeth 223 of the stator core 221, and a plurality of connector leads 238 that are located in the connector portion 231b extend respectively into the interior of this board housing slot 236. Note that the one end portions of the motor driving leads 237 and connector leads 238 are located in the other aperture (i.e., the aperture on the side where the cover 233 is mounted) of the board housing slot 236.

The motor driving leads 237 and the connector leads 238 are bent inside the board housing slot 236 so as to be parallel with the axial direction of the stator core 221 and so as to also face in the insertion direction of the control board 239 (i.e., towards the right in FIG. 13). As a result, terminal portions 237a and 238a at one end of the leads 237 and 238 are arranged so such that they each form rows. Furthermore, the rows of the terminal portions 237a and 238a are arranged in parallel with each other, and a slight gap is formed between the rows of the two terminal portions 237a and 238a. Furthermore, the terminal portions 237a and 238a protrude towards the outside through the other aperture. A row of board leads 240 which are integral with the control board 239 are placed in this gap between the rows of terminal portions 237a and 238a. As a result, the motor driving leads 237 and the connector leads 238 are electrically connected together via the control board 239.

Note that, as is shown in FIG. 13 and FIG. 15, terminal portions 237b at the other end of the motor driving leads 237 are located in the vicinity of the respective stator teeth 223 of the stator core 221. The coil wires of the coils 222 that are wound onto the stator teeth 223 are lifted up to the terminal portions 237b. In contrast, terminal portions 238b at the other end of the connector leads 238 are located inside a recessed connector engaging portion 241 that is formed in the connector portion 231b facing in a direction which is orthogonal to the axial direction of the stator core 221.

The motor driving leads 237 and connector leads 238 are insert molded in the molded frame portion 231 of the housing 211 together with the stator core 221.

The control board 239 is used for mounting electronic components and the like that control the driving of the electric motor 212. Both side portions of the control board 239 are held by guide grooves 242 that are formed in two inner side surfaces of the board housing slot 236, and the plurality of board side leads 240 are lined up in the surface direction and fixed to the distal end portion in the insertion direction of the control board 239. Distal end portions of these board side leads 240 protrude from the control board 239 in the surface direction. Because these guide grooves 242 are formed extending in the axial direction of the stator core 221, the control board 239 is held in the guide grooves 242 in parallel with this axial direction, and also such that the surface of the control board 239 faces the stator core 221.

In this manner, as a result of the control board 239 being held in the guide grooves 242 in the board housing slot 236, the row of board side leads 240 of the control board 239 are inserted between the rows of terminal portions 237a and 238a of the two leads 237 and 238 of the molded frame portion 231. Consequently, the terminal portions 237a and 238a and the board side leads 240 are placed in mutual contact, and this contact portion protrudes to the outside of the board housing slot 236. These terminal portions 237a and 238a and the board side terminals 240 are then fixed in a connected state by fusing (i.e., welding) or solder or the like.

The surface side frame body 232 is formed from a metal such as aluminum. The surface side frame body 232 is constructed by forming a boss portion 252, which is formed by a short cylindrical body, integrally with an inner side of an outer side frame portion 251, which has the same outer configuration as that of the molded frame portion 231, by means of the flat plate portion 214 that links the boss portion 252 and the outer side frame portion 251. This boss portion 252 is located on the same axis as that of the stator core 221 when the surface side frame body 232 is superimposed on the molded frame portion 231. A bearing 253 which rotatably supports the rotor shaft 213 of the electric motor 212 is fixed to an internal portion of the boss portion 252. In addition, a notch is formed in the flat plate portion 214 in a position that corresponds to the board housing slot 236 of the molded frame portion 231. A window portion 254 where a rear end portion of the control board 239 which is held in the molded frame portion 231 is placed is formed in the flat plate portion 214.

In a state in which this surface side frame body 32 and the molded frame portion 231 are joined together, the rear end portion of the control board 239 is exposed via the window portion 254 of the surface side frame body 232. The bracket portion 235 is mounted inside the window portion 254 so as to cover this exposed portion, and is assembled together with the molded frame portion 231 and these are then fixed together. Namely, this bracket portion 235 performs the role of covering the rear end portion of the control board 239. As is shown in FIG. 13, FIG. 19, and FIG. 20, an output shaft angle detection sensor 257 and motor pole detection sensors 256 formed by a hole element or the like are integrally fixed to the bracket portion 235.

The motor pole detection sensors 256 are placed on the side in the axial direction of the rotor 218 where the surface side frame body 232 is mounted such that, when the bracket portion 235 has been inserted through the window portion 254 of the surface side frame body 232 and joined to the molded frame portion 231, they face the permanent magnets 219 of the rotor 218. The motor pole detection sensors 256 detect magnetic flux variations of the permanent magnets 219 which move in conjunction with the rotation of the rotor 218, and thereby detect the position in the rotation direction of the permanent magnets 219. Three motor pole detection sensors 256 (56A through 56C in FIG. 19) are fixed at intervals in the circumferential direction.

In contrast, the output shaft angle detection sensor 257 is placed on an angle sensor yoke 258 on the outer surface of the surface side frame body 232 when the bracket portion 235 has been inserted through the window portion 254 of the surface side frame body 232 and joined to the molded frame portion 231. The angle sensor yoke 258 is described below. Sensor leads 259 and 260 that are connected to these sensors 256 and 257 are fixed to the bracket portion 235 so as to be partially embedded therein. When the bracket portion 235 is in a state of being joined to the molded frame portion 231, one end portions of these sensor leads 259 and 260 are in contact with and are consequently electrically connected to the control board 239 which is housed in the board housing slot 236. As a result, the sensor leads 259 and 260 are electrically connected to the connector leads 238 via the control board 239 and the board side leads 240.

Moreover, as is shown in FIG. 13 and FIG. 15, the internal gear 216 of the reduction gear 217 is integrally fixed to the boss portion 252 of the surface side frame body 232. This internal gear 216 is formed having an overall cylindrical shape. Internal teeth 216b are formed on an inner circumferential portion which extends for half the length of a cylindrical portion 216a of the internal gear 216. The boss portion 252 is press-inserted into the remaining half. Grooves 266 that engage with two pins 265 protruding from the flat plate portion 214 of the surface side frame body 232 are formed in an outer circumferential portion of the cylindrical portion 216a. Rotation of the internal gear 216 is prevented when the pins 265 are engaged in the grooves 266. As a result of half of the length of the cylindrical portion 216a being used for press-insertion while the remaining half is used for forming the internal teeth 216b in this manner, stress arising from the press-insertion has no effect on the internal teeth 216b.

The ring-shaped angle sensor yoke 258 is fitted onto and also fixed to the outer side of the internal gear 216, and the output shaft angle detection sensor 257 is superimposed on one location in the circumferential direction of this angle sensor yoke 258.

One end portion of the rotor shaft 213 is rotatably supported by the bearing 253 inside the boss portion 252 of the surface side frame body 232, and protrudes from the outer surface of the boss portion 252. This protruding end portion forms an eccentric shaft portion 213a which is eccentric relative to the center of rotation of the rotor shaft 213. This eccentric shaft portion 213a is placed on the inner side of the internal gear 216. The external gear 215 that meshes with this internal gear 216 is rotatably supported via a bearing 267 on the eccentric shaft portion 213a. The reduction gear 217 is formed with the meshing structure of the two gears 215 and 216. The external gear 215 is rotated around the center axis of the rotor shaft 213 at the same time as it revolves in the circumferential direction of the internal gear 216. The rotation component thereof is reduced relative to the rotation of the rotor shaft 213.

A plurality of connecting pins 268 that are parallel to the rotor shaft 213 are provided at intervals in the circumferential direction on an outer surface of the external gear 215. Distal end portions of these connecting pins 268 protrude onto the outer side from an outer side surface 232a which forms an external mounting surface of the surface side frame body 232.

The cover 233 is mounted on the opposite side of the molded frame portion 231 from the surface side frame body 232. The cover 233 covers the locations where the board side terminals 240 are connected to the terminal portions 237a and 238a of the control board 239, as well as the stator core 221 and the like. A recessed portion 269 is formed in a center portion of this cover 233, and a bearing 270 which rotatably supports the other end portion of the rotor shaft 213 is fitted into this recessed portion 269. Namely, the cover 233 and the surface side frame body 232 play a role to support each end of the rotor shaft 213 via the bearings 253, 270.

Furthermore, as is shown in FIG. 15, through holes 231c, 232c, and 233c through which identical reference pins 255 are press-inserted in the axial direction of the stator core 221 and the rotor shaft 213 are formed in the molded frame portion 231, the surface side frame body 232, and the cover 233. By press-inserting these reference pins 255, the molded frame portion 231, the surface side frame body 232, and the cover 233 are precisely positioned and joined into a single body. As a result, the stator core 221 of the molded frame portion 231, the bearing 253 inside the boss portion 252 of the surface side frame body 232, and the bearing 270 inside the recessed portion 269 in the cover 233 are placed on the same axis. Namely, the rotor 218 and the stator core 221 are placed on the same axis.

(Output Mechanism)

Figure 14:
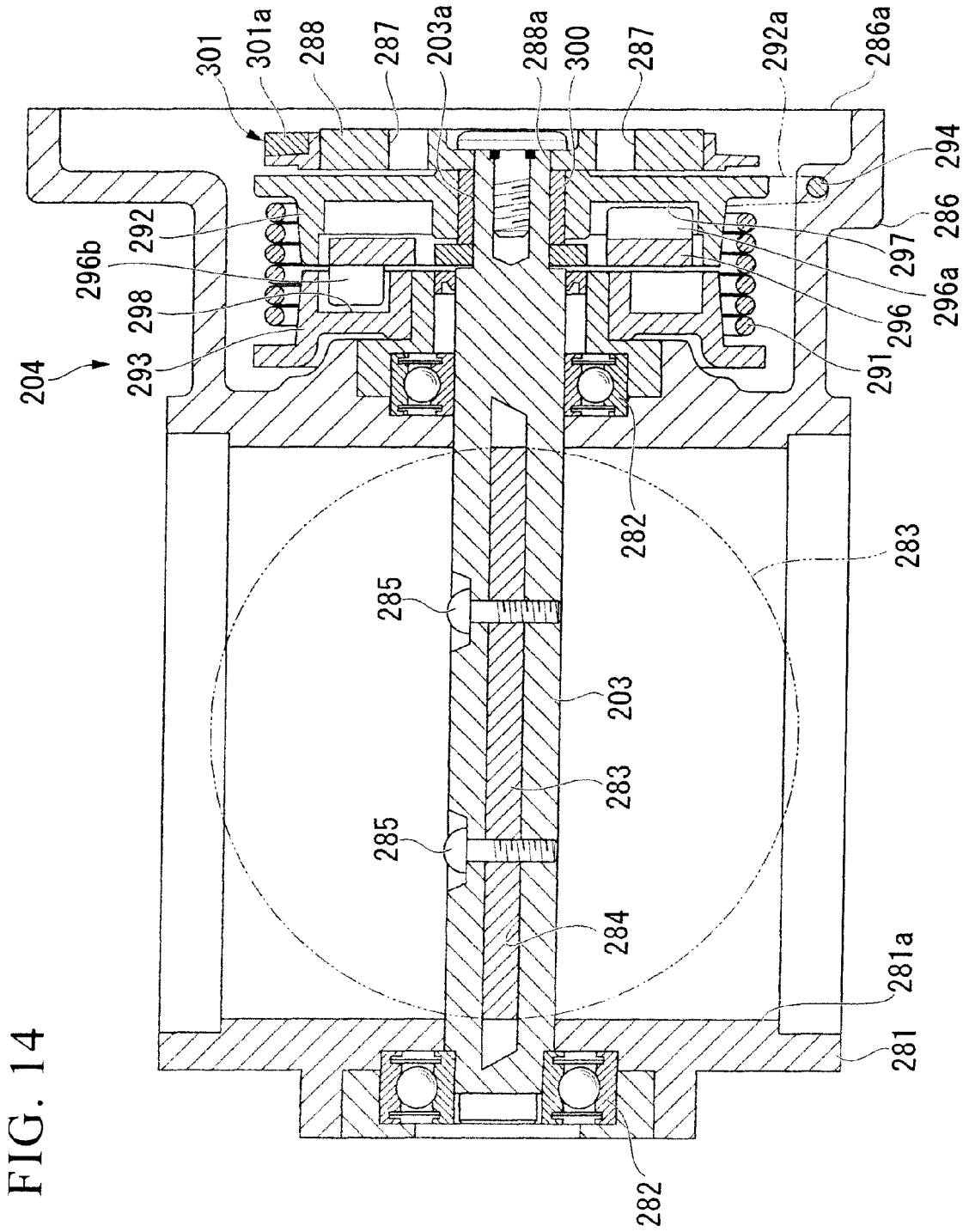
FIG. 14 is a vertical cross-sectional view showing a throttle body as an embodiment of an output mechanism that is driven by the rotary actuator shown in FIG. 13.
Figure 16:
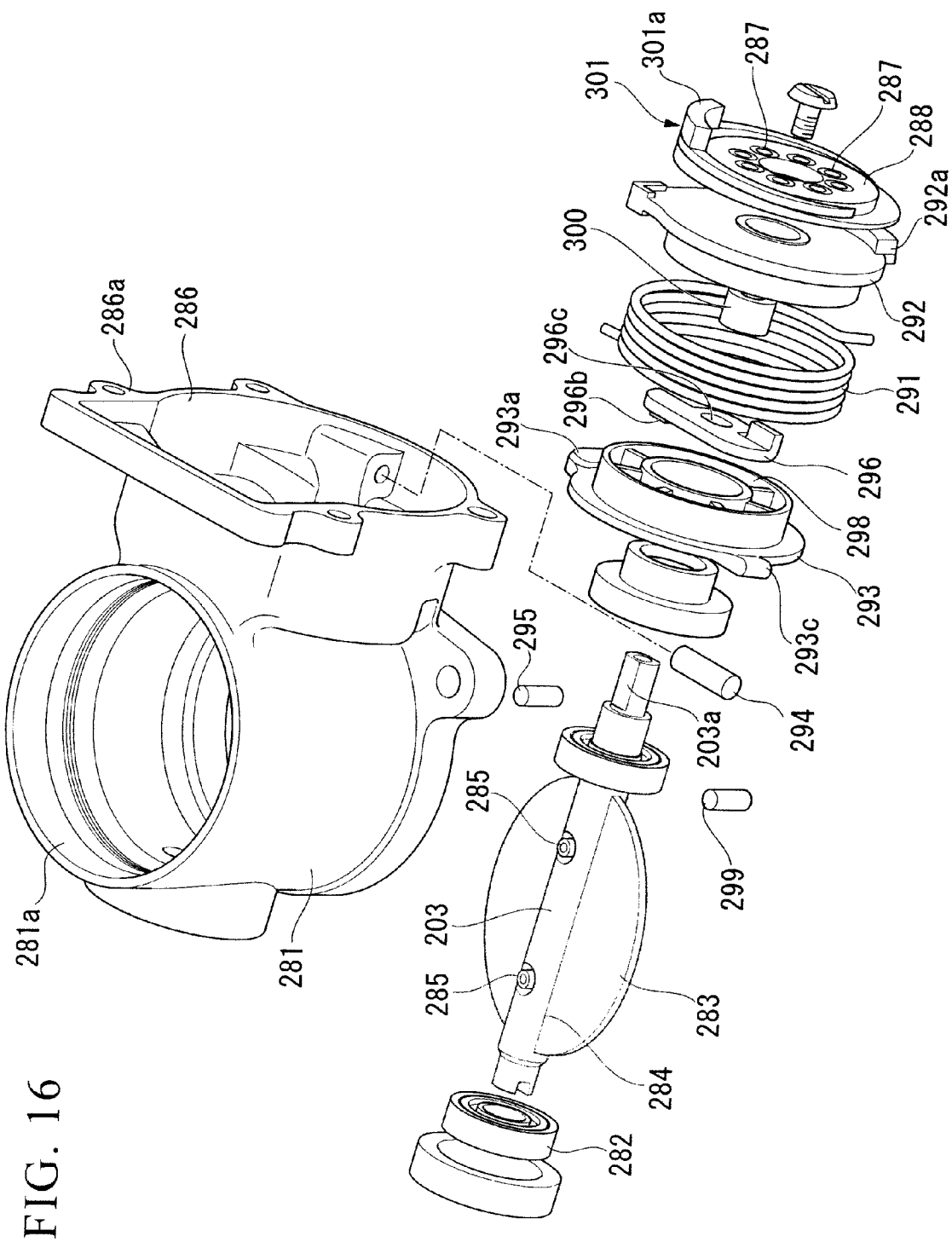
FIG. 16 is an exploded perspective view of the output mechanism shown in FIG. 14.

In contrast, in the present embodiment, the output mechanism 204 is a butterfly type of throttle valve. As is shown in FIG. 14 and FIG. 16, both end portions of an output shaft (i.e., valve shaft) 203 which has been positioned so as to transverse a throttle body 281 are rotatably supported via bearings 282 in a wall of the throttle body 281. A plate-shaped valve body 283 is fixed to this output shaft 203. In this case, a slit 284 which extends in the longitudinal direction of the output shaft 203 is formed in the output shaft 203. The valve body 283 is inserted inside the slit 284 and is then fixed in position by screws 285 in a center portion thereof. A case portion 286 which is open to the outside is formed integrally with a side portion of the throttle body 281. The outer side surface 232a of the surface side frame body 232 of the rotary actuator 202 is placed against an outer side surface 286a of the case portion 286, which forms an external mounting surface, and the two are then fixed together using screws.

One end portion of the output shaft 203 protrudes inside the case portion 286. A circular plate 288 that has holes 287 through which the respective connecting pins 268 of the external gear 215 can be inserted is fixed at a right angle to the distal end of the output shaft 203. When the surface side frame body 232 of the rotary actuator 202 is mounted on the case portion 286, the connecting pins 268 of the external gear 215 are connected to the interior of the holes 287 in the plate 288. The holes 287 of the plate 288 are formed having a larger inner diameter than the outer diameter of the connecting pins 268. As a result, eccentric motion of the eccentric shaft portion 213a (i.e., revolution motion of the external gear 215) is absorbed, and only the rotation component of the external gear 215 is transmitted. Namely, the connecting pins 268 of the external gear 215 and the plate 288 which includes the holes 287 form transmission portions which are used to transmit drive force from the rotary actuator 202 to the output mechanism 204. These two transmission portions are assembled together so as to create a transmission unit 289.

Moreover, a return spring 291 that includes a coil spring that biases the output shaft 203 in a direction in which it seals the valve body 283 is provided between an inner wall of the case portion 286 of the output mechanism 204 and the output shaft 203. Both end portions of this return spring 291 are held in a set of holding components 292 and 293 that are placed at an interval in the longitudinal direction of the output shaft 203. The holding components 292 and 293 are both shaped as circular disks, and have protruding portions 292a and 293a that each face outwardly in the radial direction. Stopper portions 294 and 295 that come up against the protruding portions 292a and 293a and restrict the restore position of the return spring 291 are formed in an inner wall of the case portion 286.

Moreover, an arm component 296 that is fixed to the output shaft 203 is provided between the two holding components 292 and 293. Protruding pieces 296a and 296b that engage respectively with circular arc grooves 297 and 298 (in FIG. 16 only the circular arc groove 298 of the one holding component 293 is shown) of the respective holding components 292 and 293 are formed on the arm component 296. The arm component 296 is fitted between the holding components 292 and 293 such that the respective protruding pieces 296a and 296b are placed within the circular arc grooves 297 and 298 of the holding components 292 and 293.

In this case, the output shat 203 is rotatably inserted through the two holding components 292 and 293. A key portion 203a having a square cross-section is formed on the distal end portion of the output shaft 203. The holes 288a and 296c in the plate 288 and the arm component 296 through which the output shaft 203 is inserted are also formed in a square shape. By fitting the key portion 203a into these holes 288a and 296c, the output shaft 203, the plate 288, and the arm component 296 are fixed as a single body.

From a state in which the protruding portions 292a and 293a of the respective holding components 292 and 293 are in contact with the stopper portions 294 and 295, relative rotation between the output shaft 203 and the respective holding components 292 and 293 is allowed within the angular range of the circular arc grooves 297 and 298. Moreover, as a result of the protruding pieces 296a and 296b of the arm component 296 anchoring terminal portions of the circular arc grooves 297 and 298, the output shaft 203 and the respective holding components 292 and 293 are rotated as a single body.

In the examples shown in FIG. 14 and FIG. 16, when the valve body 283 is closed, the protruding portion 292a of the holding component 292 on the distal end side of the output shaft 203 is pressed against the stopper portion 294 by the biasing force from the return spring 291. When the valve body 283 is driven to rotate in a direction in which it opens, the arm component 296 is rotated in resistance to the biasing force of the return spring 291 while anchoring the holding component 292. In contrast, both when the valve body 283 is closed and also when it is open, the protruding portion 293a of the other holding component 293 is held by the biasing force of the return spring 291 in a state of contact with the stopper 295. Note that when the valve body 283 is closed, the valve body 283 does not completely seal a flow path 281a of the throttle body 281, and a small gap remains. A protruding portion 293c and a stopper portion 299 that restrict the rotation position of the holding component 293 in a closed state are separately provided. As a result of the respective stopper portions 294, 295, and 299 being formed by screw components, fine adjustments can be made to the positions thereof.

When the output shaft 203 is driven to rotate by the rotary actuator 202, the arm component 296 which is integral with the output shaft 203 is rotated, while anchoring the holding component 92, in a direction in which the protruding portion 292a is moved away from the stopper portion 294. By releasing the driving force, the protruding portion 292a is restored by the biasing force of the return spring 291 to a position where it is in contact against the stopper portion 294.

Note that the symbol 300 in FIG. 14 and FIG. 16 indicates a collar through which the key portion 203a is inserted that enables the holding component 293 to rotate freely.

A circular arc magnet 301 which has the same diameter as that of the ring-shaped angle sensor yoke 258 of the rotary actuator 202 is fixed on an outer circumferential portion of the plate 88 so as to extend in the circumferential direction. When the rotary actuator 202 is incorporated in the output mechanism 204, the circular arc magnet 301 is positioned so as to face the angle sensor yoke 258. By forming a center portion in the circumferential direction of the circular arc magnet 301 with the greatest thickness, a raised portion 301a which protrudes to the maximum height from the surface of the plate 288 is formed on the circular arc magnet 301. The circular arc magnet 301 is formed such that the thickness thereof becomes gradually thinner moving outwards in the circumferential direction from the raised portion 301a. When the surface side frame body 232 of the rotary actuator 202 is assembled in the case portion 286 of the output mechanism 204, the output shaft angle detection sensor 257 which is located on the angle sensor yoke 258 is interposed between the angle sensor yoke 258 and the circular arc magnet 301. The output shaft angle detection sensor 257 is able to detect the output shaft angle from the magnetic flux variations that accompany a rotation of the circular arc magnet 301.

In the rotary apparatus 201 that is constructed in this manner, if the electric motor 212 of the rotary actuator 202 is driven, the eccentric shaft portion 213a at the end portion of the rotor shaft 213 performs eccentric rotations in conjunction with the rotation of the rotor shaft 213. As a result, the external gear 215 which meshes with the internal gear 216 is rotated while revolving along the internal gear 216. Because the connecting pins 268 that protrude from this external gear 215 are engaged in the holes 287 in the plate 288 of the output mechanism 204, the rotation force of the external gear 215 is transmitted to this plate 288. Because gaps are provided between the holes 287 in the plate 288 and the connecting pins 268 of the external gear 215, the revolution component of the external gear 215 is absorbed within this gap and only the rotation component is transmitted to the plate 288. In this case, the rotation force from the electric motor 212 is transmitted to the plate 288 with the rotation rate being reduced because of the functioning of the reduction gear 217 which includes the external gear 215 and the internal gear 216, so that the output shaft 203 that is connected to the plate 288 is pivoted thereby enabling the valve body 283 to be opened or closed.

The driving of the motor to open or close the valve is controlled in accordance with the position of the rotor 218 which is determined based on detection results from the motor pole detection sensors 256. Furthermore, the valve body 283 is opened or closed appropriately while feedback control of the driving to open or close the valve body 283 is performed based on detection results from the output shaft angle detection sensor 257.

According to the rotary actuator 202 and the electric motor 212 that are provided in the throttle valve apparatus 201 having the above described structure, because the control board 239 is placed on the outer circumferential side of the stator core 221, it is possible to assemble the apparatus such that, after electrical components which are placed on the inner circumferential side of the stator core 221 such as the rotor 218 have been assembled inside the housing 211, the various electrical components are electrically connected to the control board 239. Namely, it is possible to reduce the number of electrical components that are assembled inside the housing 211 after the electrical connections between the board side leads 240, the motor driving leads 237, and the connector leads 238 have been accomplished by fusing (i.e., welding) or soldering or the like. In particular, in the present embodiment, these electrical connections are made after the task of assembling the rotary actuator 202, excluding the cover 233, has been completed.

Accordingly, it is possible to prevent the stress generated when the other electrical components are being assembled, and stress which is based on dimensional irregularities of the molded frame portion 231, the surface side frame body 232, and the cover 233 that make up the housing 211 being applied to the electrical connection portions, namely, to prevent the task of assembling the electrical components having an effect on the electrical connection portions. As a result, it is possible to achieve an improvement in the electrical reliability of the electric motor 212, the rotary actuator 202, and the throttle valve apparatus 201.

Moreover, in a state in which the control board 239 is housed inside the board housing slot 236, portions where the board side leads 240 are in contact with the motor driving leads 237 and connector leads 238 protrude to the outside. Because of this, electrical connections between the board side leads 240 and the motor driving leads 237 and connector leads 238 can be easily achieved.

Furthermore, because the motor driving leads 237 and connector leads 238 are placed on the distal end portion in the insertion direction of the control board 239 of the board housing slot 236, when the control board 239 is being housed inside the board housing slot, it is not obstructed by the motor driving leads 237 and connector leads 238. Because of this, the task of housing the control board 239 is easily performed.

Moreover, by placing one end portions of the sensor leads 259 and 260 in contact with the control board 239 when the control board 239 is housed in the board housing slot 236, it is also easy to form electrical connections using solder or the like between the sensor leads 259 and 260 and the control board 239.

On the other hand, according to the rotary actuator 202 and electric motor 212 that are provided in the throttle valve apparatus 201 having the above described structure, because the stator core 221 is insert molded in the molded frame portion 231, it is not necessary to perform the task of assembling the stator core 221 inside the housing 211. Because of this, it is possible to eliminate any errors arising from this assembly task. Accordingly, it is possible to improve the axial accuracy of the stator core 221 relative to the rotor 218. Because of this, it is possible to shrink the air gap between the rotor 218 and the stator core 221, and achieve an improvement in the performance and efficiency of the electric motor 212. Moreover, because it is not necessary to perform the task of assembling the stator core 221, it is possible to simplify the assembly task that is required by the structure of the electric motor 212 and rotary actuator 202.

Furthermore, it is possible to easily match the axes of the rotor 218 and stator core 221 simply by accurately forming the reference pins 255 and the through holes 231c, 232c, and 233c without the bearings 253 and 270 which support the rotor shaft 213, the boss portion 252 of the surface side frame body 232 which forms mounting portions for the bearings 253 and 270, and the recessed portion 269 of the cover 233 having to be set to a particularly high level of accuracy. Because of this, it is possible to easily improve the coaxial accuracy of the electric motor 212. Accordingly, it is possible to minimize the air gap between the rotor 218 and the stator core 221 even further.

Moreover, by molding the motor driving leads 237 and connector leads 238 together with the stator core 221 integrally with the molded frame portion 231, it is easy to perform inspections such as conductivity tests of the coil 222, the motor driving leads 237, and the connector leads 238. Furthermore, by molding the motor driving leads 237 integrally with the molded frame portion 231, the coil 222 can be electrically connected in advance to the other end portions of the motor driving leads 237 prior to the start of the assembly task. Because of this, it is possible to reduce those portions that have to be electrically connected during the assembly task. Namely, it is possible to reduce the number of electrical contact points during the assembly task. The cumulative effect of this is that it is possible to improve the reliability of the electric motor 212 and the rotary actuator 202. Furthermore, the assembly task can be carried out more easily, resulting in it also being possible to improve the manufacturing efficiency of the electric motor 212 and the rotary actuator 202.

Moreover, by extending the one end portions of the motor driving leads 237 and connector leads 238 to the board housing slot 236, it is possible to easily electrically connect the motor driving leads 237, the connector leads 238, and the control board 239 when the control board 239 is in a state of being housed inside the board housing slot 236.

Furthermore, by integrally molding the stator core 221, the motor driving leads 237, and the connector leads 238 in the molded frame portion 231, and also forming the board housing slot 236 in the same molded frame portion 231, it is possible to reduce the size of the electric motor 212 and rotary actuator 202.

Moreover, according to this rotary actuator 202, by placing both the motor pole detection sensors 256 and the output shaft angle detection sensor 257 on the side of the rotor 218 where the output shaft 203 of the output mechanism 204 is located, they can be integrally fixed to the same bracket portion 235 forming the housing 211. By integrally fixing this plurality of sensors 256 and 257 to the same bracket portion 235, the task of positioning the plurality of sensors 256 and 257 within the housing 211 is made easier. Moreover, because it is not necessary to individually assemble the sensors 256 and 257 inside the housing 211, the assembly tasks of the manufacturing of the rotary actuator 202 can be simplified.

Furthermore, by fixing the motor pole detection sensors 256, the output shaft angle detection sensor 257, and the sensor leads 259 and 260 on the same bracket portion 235, the respective electrical connections between this plurality of sensors 256 and 257 and the sensor leads 259 and 260 can be omitted. Because of this, it is possible to reduce to a minimum the number of electrical contact points during the assembly task. Accordingly, the assembly task can be carried out more easily, resulting in it also being possible to improve the manufacturing efficiency of the rotary actuator 202. The cumulative effect of this is that it is possible to improve the electrical reliability of the rotary actuator 202.

Note that the electric motor of the present invention and the rotary actuator of the present invention in which the rotary actuator is provided with this electric motor are not limited solely to the structure in the above described embodiments. The structure of the above described electric motor and the rotary actuator that is provided with this electric motor can be altered insofar as the alterations do not depart from the spirit or scope of the present invention.

For example, if the sole aim is to improve electrical reliability, then the motor driving leads 237 and connector leads 238 do not need to be molded integrally with the molded frame portion 231, and it is sufficient if they are at least assembled in the housing 211.

Moreover, in the above description, the motor pole detection sensors 256, the output shaft angle detection sensor 257, and the sensor leads 259 and 260 are fixed as a single unit to the bracket portion 235, however, if the sole aim is to improve electrical reliability, then it is sufficient for them to at least be fixed inside the housing 211 and in contact with the control board 239 while the control board 239 is housed in the board housing slot 236. Furthermore, the motor pole detection sensors 256 only need to be placed facing the permanent magnets 219 of the rotor 218 in the axial direction rotor 218, and it is also possible for them to be placed, for example, on the side where the cover 233 is mounted.

Furthermore, the board housing slot 236 of the molded frame portion 231 has been formed so as to house the distal end portion side of the control board 239, however, it may also be formed, for example, so as to house the entire control board 239.

Moreover, the control board 239 is housed within the board housing slot 236 that is formed in the molded frame portion 231, however, if the sole aim is to improve electrical reliability, then it is sufficient if the control board 239 is assembled inside the housing 211 so as to be at least parallel to the axial direction of the stator core 221 and positioned on the outer circumferential side of the stator core 221. The board side leads 240 may be in contact with the motor driving leads 237 and connector leads 238 when the control board 239 is assembled inside the housing 211.

If, on the other hand, the sole aim is to improve the axial accuracy of the stator and thereby improve the performance and efficiency of the electric motor, then it is sufficient if the board housing slot 236 is formed so as to at least house the control board 239, and so that the board side leads 240 are in contact with the motor driving leads 237 and connector leads 238 when the control board 239 is housed in the board housing slot 236.

Furthermore, if the sole aim is to improve the axial accuracy of the stator and thereby improve the performance and efficiency of the electric motor, then it is also possible for the electric motor 212 and the rotary actuator 202 to be constructed without including the control board 239. In this case, for example, it is possible for the motor driving leads 237 and the connector leads 238 which are connected to the motor driving leads 237 to be directly connected, or for these to be formed as a single body.

Moreover, in the above described embodiment, the permanent magnets 219 are placed on the outer circumferential surface of the rotor 218, however, it is also possible, for example, for them to be fixed to an internal portion of the rotor 218. Furthermore, it is not essential for the rotor 218 to be provided with the permanent magnets 219, and the rotor 218 may also be constructed such that, for example, a plurality of salient poles that are formed by magnetic bodies such as iron or the like are formed protruding from the outer circumferential surface of the rotor 218. Namely, it is sufficient if the rotor 218 is at least provided with rotor magnetic poles such as these permanent magnets 219 or salient poles or the like.

Moreover, a structure is employed in which the motor pole detection sensors 265 detect magnetic flux variations in the permanent magnets 219, however, it is also possible for them to detect magnetic flux variations in individual sensor magnets that correspond to rotor magnetic poles such as the permanent magnets 219 or the like. Note that these sensor magnets may be formed, for example, in a substantially toroidal shape centering on the rotor 213 in which the respective N poles and S poles are lined up alternatingly in the circumferential direction. The sensor magnets may be provided on end surfaces of the rotor 218 that face the motor pole detection sensors 265.

Moreover, a structure is employed in which the reduction gear 217 is formed by the external gear 215 and the internal gear 216, however, the present invention is not limited to this, and it is sufficient if the rotation force of the electric motor 212 is transmitted to the output shaft 203 of the output mechanism 204 with the rotation rate being reduced, the output mechanism 204 being on the outside of the electric motor 212. Note that, depending on the structure of the reduction gear, it may also not be necessary to form the eccentric shaft portion 213a on one end portion of the rotor shaft 213.

Figure 23:
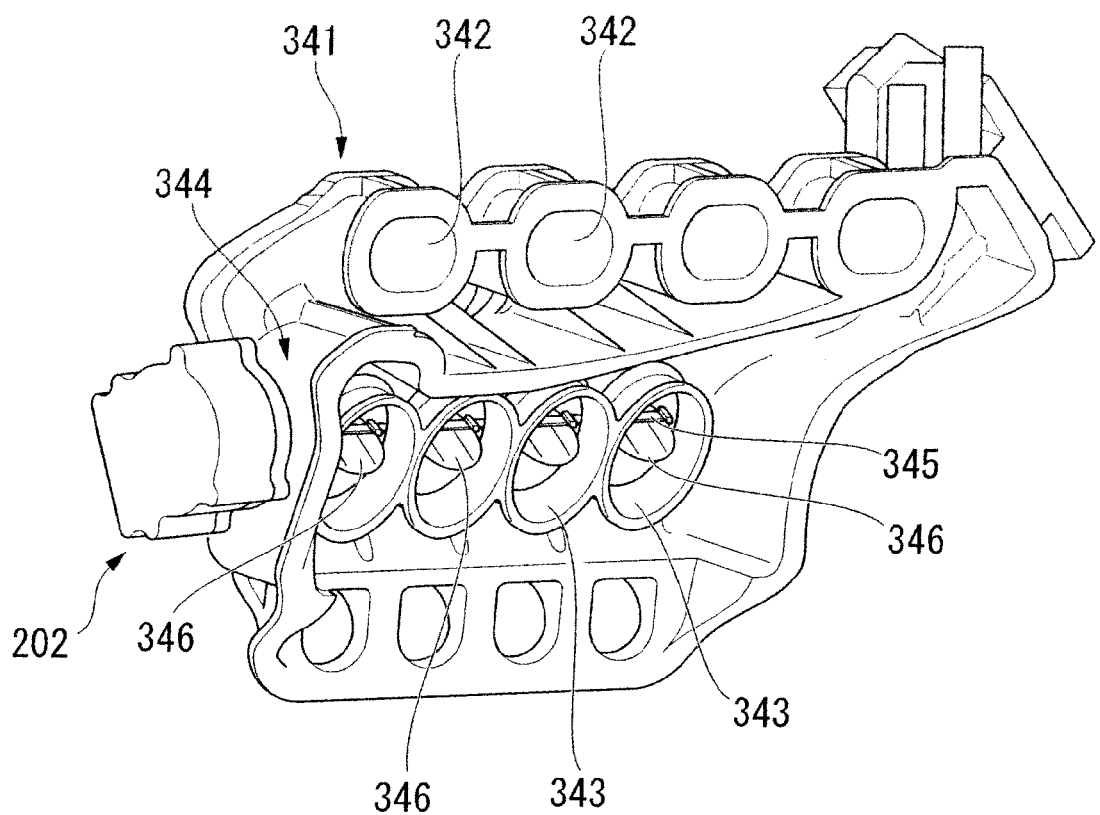
FIG. 23 is a perspective view showing an example in which, as another embodiment of a rotary apparatus in which the rotary actuator shown in FIG. 13 has been applied, the rotary apparatus is applied to a drive apparatus for a line switching valve of a variable intake apparatus.

In the above described embodiments, an example is illustrated in which the rotary actuator of the present invention is provided in a throttle valve apparatus, however, it can also be provided, for example, in the variable intake valve apparatus (i.e., rotary apparatus) shown in FIG. 23.

In the case of this variable intake valve apparatus 341, a line switching valve which switches between a main intake line 342 and an auxiliary intake line 343 of this rotary apparatus 341 forms an output mechanism 344, and a plurality of valve bodies 346 are fixed to an output shaft 345 of this output mechanism 344. The rotary actuator 202 is applied as a mechanism to drive this output shaft 345. A rotary actuator having the same structure as that described in the second embodiment above is used for this rotary actuator 202, while the output mechanism 344 has the same structure as the output mechanism of the above described embodiment except for the fact that a plurality of valve bodies 346 are provided consecutively on the output shaft 345.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

We claim:

1. An electric motor in which a rotor, a ring-shaped stator core that is positioned so as to encircle the rotor and that has a plurality of stator teeth around which coils are wound, a control board on which electronic components are mounted, motor driving leads that are used for electrically connecting the coils to the control board, and connector leads that are electrically connected to the control board are assembled inside a housing, wherein
the control board is placed on an outer circumferential side of the stator core so as to be parallel with the axial direction of the stator core; and
the motor driving leads and the connector leads are in contact with board side leads that are integral with the control board.

2. The electric motor according to claim 1, wherein
the housing is provided with a housing main body in which a board housing slot that houses at least a portion of the control board is formed;
one end portions of both the motor driving leads and the connector leads extend to the interior of the board housing slot; and
when the control board is housed in the board housing slot, contact portions between the board side leads and the respective one end portions of the motor driving leads and the connector leads protrude outside the board housing slot.

3. The electric motor according to claim 2, wherein
one aperture of the board housing slot forms an insertion aperture into which the control board is inserted, and one end portions of the motor driving leads and the connector leads are placed in the other aperture of the board housing slot; and
the board side leads are provided at a distal end portion of the control board in the insertion direction thereof.

4. A rotary actuator comprising the electric motor according to claim 1, wherein
a reduction gear that transmits rotation force from the electric motor to an external output shaft with the rotation rate being reduced is provided on one end portion of the shaft portion of the rotor that constitutes the electric motor;
a motor pole detection sensor that detects a rotation of the rotor, an output shaft angle detection sensor that detects a rotation position of the output shaft, and a plurality of sensor leads that are used to electrically connect the motor pole detection sensor and the output shaft angle detection sensor respectively to the control board are fixed inside the housing; and
one end portions of the sensor leads are in contact with the control board when the control board is housed in the board housing slot.

* * * * *